United States Patent
Brockmann et al.

(10) Patent No.: US 9,123,084 B2
(45) Date of Patent: Sep. 1, 2015

(54) GRAPHICAL APPLICATION INTEGRATION WITH MPEG OBJECTS

(75) Inventors: Ronald A. Brockmann, Utrecht (NL); Anuj Dev, Amsterdam (NL); Onne Gorter, Hilversum (NL); Gerrit Hiddink, Utrecht (NL); Maarten Hoeben, Amersfoort (NL)

(73) Assignee: ActiveVideo Networks, Inc., San Jose, CA (US)

( * ) Notice: Subject to any disclaimer, the term of this patent is extended or adjusted under 35 U.S.C. 154(b) by 474 days.

(21) Appl. No.: 13/445,104

(22) Filed: Apr. 12, 2012

(65) Prior Publication Data

US 2013/0272394 A1    Oct. 17, 2013

(51) Int. Cl.
| | |
|---|---|
| *H04N 11/02* | (2006.01) |
| *G06T 9/00* | (2006.01) |
| *H04N 19/107* | (2014.01) |
| *H04N 19/154* | (2014.01) |
| *H04N 19/174* | (2014.01) |

(52) U.S. Cl.
CPC ............... *G06T 9/00* (2013.01); *H04N 19/107* (2014.11); *H04N 19/154* (2014.11); *H04N 19/174* (2014.11)

(58) Field of Classification Search
USPC ........................................ 375/240.01–240.29
See application file for complete search history.

(56) References Cited

U.S. PATENT DOCUMENTS

| | | |
|---|---|---|
| 3,889,050 A | 6/1975 | Thompson |
| 3,934,079 A | 1/1976 | Barnhart |
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |

(Continued)

FOREIGN PATENT DOCUMENTS

| | | |
|---|---|---|
| AT | 191599 T | 4/2000 |
| AT | 198969 T | 2/2001 |

(Continued)

OTHER PUBLICATIONS

ActiveVideo, http://www.activevideo.com/, as printed out in year 2012, 1 pg.

(Continued)

*Primary Examiner* — Dave Czekaj
*Assistant Examiner* — Leron Beck
(74) *Attorney, Agent, or Firm* — Morgan, Lewis & Bockius LLP

(57) ABSTRACT

System and methods are provided to cache encoded graphical objects that may be subsequently combined with other encoded video data to form a data stream decodable by a client device according to a format specification. Paint instructions relating to a graphical object are sent from a layout engine to a rendering library. A shim intercepts these instructions and determines whether the graphical object already has been rendered and encoded. If so, a cached copy of the object is transmitted to the client device. If not, the shim transparently passes the instructions to the rendering library, and the object is rendered, encoded, and cached. Hash values are used for efficiency. Methods are disclosed to detect and cache animations, and to cut and splice cached objects into encoded video data.

24 Claims, 20 Drawing Sheets

(56) References Cited

U.S. PATENT DOCUMENTS

| | | |
|---|---|---|
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,144,448 A | 9/1992 | Hornbaker, III et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Letteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |

(56) References Cited

U.S. PATENT DOCUMENTS

| | | |
|---|---|---|
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,742,289 A | 4/1998 | Naylor et al. |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty et al. |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,959,690 A | 9/1999 | Toebes et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmusse |
| 5,995,488 A | 11/1999 | Kalhunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty |
| 6,049,539 A | 4/2000 | Lee et al. |
| 6,049,831 A | 4/2000 | Gardell et al. |
| 6,052,555 A | 4/2000 | Ferguson |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,131,182 A | 10/2000 | Beakes et al. |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,169,573 B1 | 1/2001 | Sampath-Kumar et al. |
| 6,177,931 B1 | 1/2001 | Alexander et al. |
| 6,182,072 B1 | 1/2001 | Leak et al. |
| 6,184,878 B1 | 2/2001 | Alonso et al. |
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,256,047 B1 | 7/2001 | Isobe et al. |
| 6,259,826 B1 | 7/2001 | Pollard et al. |
| 6,266,369 B1 | 7/2001 | Wang et al. |
| 6,266,684 B1 | 7/2001 | Kraus et al. |
| 6,275,496 B1 | 8/2001 | Burns et al. |
| 6,292,194 B1 | 9/2001 | Powell, III |
| 6,305,020 B1 | 10/2001 | Hoarty et al. |
| 6,317,151 B1 | 11/2001 | Ohsuga et al. |
| 6,317,885 B1 | 11/2001 | Fries |
| 6,349,284 B1 | 2/2002 | Park et al. |
| 6,385,771 B1 | 5/2002 | Gordon |
| 6,386,980 B1 | 5/2002 | Nishino et al. |
| 6,389,075 B2 | 5/2002 | Wang et al. |
| 6,389,218 B2 | 5/2002 | Gordon et al. |
| 6,415,031 B1 | 7/2002 | Colligan et al. |
| 6,415,437 B1 | 7/2002 | Ludvig et al. |
| 6,438,140 B1 | 8/2002 | Jungers et al. |
| 6,446,037 B1 | 9/2002 | Fielder et al. |
| 6,459,427 B1 | 10/2002 | Mao et al. |
| 6,477,182 B2 | 11/2002 | Calderone |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michnener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |

(56) References Cited

U.S. PATENT DOCUMENTS

| | | |
|---|---|---|
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wasilewski |
| 6,727,929 B1 | 4/2004 | Bates et al. |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,030,890 B1 | 4/2006 | Jouet et al. |
| 7,050,113 B2 | 5/2006 | Campisano et al. |
| 7,089,577 B1 | 8/2006 | Rakib et al. |
| 7,095,402 B2 | 8/2006 | Kunil et al. |
| 7,114,167 B2 | 9/2006 | Slemmer et al. |
| 7,146,615 B1 | 12/2006 | Hervet et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 * | 3/2009 | O'Toole et al. .............. 380/228 |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 2001/0008845 A1 | 7/2001 | Kusuda et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Yamamoto |
| 2003/0122836 A1 | 7/2003 | Doyle et al. |

(56) References Cited

U.S. PATENT DOCUMENTS

| | | |
|---|---|---|
| 2003/0123664 A1 | 7/2003 | Pedlow, Jr. et al. |
| 2003/0126608 A1 | 7/2003 | Safadi |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bolliger et al. |
| 2007/0172061 A1 | 7/2007 | Pinder |
| 2007/0174790 A1 | 7/2007 | Jing et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0094368 A1 | 4/2008 | Ording et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Grossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |

(56) References Cited

U.S. PATENT DOCUMENTS

| | | |
|---|---|---|
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0325655 A1 | 12/2010 | Perez |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0243024 A1 | 10/2011 | Osterling et al. |
| 2011/0258584 A1 | 10/2011 | Williams et al. |
| 2011/0289536 A1 | 11/2011 | Poder et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2014/0033036 A1 | 1/2014 | Gaur et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| DE | 4408355 A1 | 10/1994 |
| DE | 69516139 | 12/2000 |
| DE | 69132518 | 9/2001 |
| DE | 69333207 | 7/2004 |
| DE | 98961961 T1 | 8/2007 |
| DE | 602008001596 | 8/2010 |
| DE | 602006015650 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |

(56) References Cited

FOREIGN PATENT DOCUMENTS

| | | |
|---|---|---|
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 11-88419 | 9/2007 |
| JP | 2008-523880 | 7/2008 |
| JP | 2008-535622 A | 9/2008 |
| JP | 04252727 B2 | 4/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 2006067924 A | 6/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |

(56) References Cited

FOREIGN PATENT DOCUMENTS

| | | |
|---|---|---|
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO 2004/073310 A1 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |

OTHER PUBLICATIONS

ActiveVideo Networks Inc., International Preliminary Report on Patentability, PCT/US2013/020769, Jul. 24, 2014, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc. Communication Pursuant to Rules 70(2) and 70a(2), EP10841764.3, Jun. 6, 2014, 1 pg.
ActiveVideo Networks Inc. Communication Pursuant to Rules 70(2) and 70a(2), EP11833486.1, Apr. 24, 2014, 1 pg.
ActiveVideo Networks Inc. Communication Pursuant to Article 94(3) EPC, EP08713106-1908, Jun. 26, 2014, 5 pgs.
ActiveVideo Networks Inc. Communication Pursuant to Article 94(3) EPC, EP08713106-2223, May 10, 2011, 7 pgs.
ActiveVideo Networks Inc. Communication Pursuant to Article 94(3) EPC, EP09713486.0, Apr. 14, 2014, 6 pgS.
ActiveVideo Networks Inc. Examination Report No. 1, AU2011258972, Apr. 4, 2013, 5 pgs.
ActiveVideo Networks Inc. Examination Report No. 1, AU2011258972, Jul. 21, 2014, 3 pgs.
ActiveVideo Networks Inc. Examination Report No. 1, AU2010339376, Apr. 30, 2014, 4 pgs.
ActiveVideo Networks Inc. Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
ActiveVideo Networks, Inc., International Search Report and Written Opinion, PCT/US2014/041430, Oct. 9, 2014, 9 pgs.
Active Video Networks, Notice of Reasons for Rejection, JP2012-547318, Sep. 26, 2014, 7 pgs.
Adams, Jerry, NTZ Nachrichtentechnische Zeitschrift. vol. 40, No. 7, Jul. 1987, Berlin DE pp. 534-536; Jerry Adams: 'Glasfasernetz for Breitbanddienste in London', 5 pgs. No English Translation Found.
Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Mar. 31, 2009, 12 pgs.
Avinity Systems B.V., International Search Report and Written Opinion, PCT/NL2007/000245, Feb. 19, 2007, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Avinity Systems B. V., Final Office Action, JP-2009-530298, Oct. 7, 2014, 8 pgs.
Bird et al., "Customer Access to Broadband Services," ISSLS 86—The International Symposium on Subrscriber Loops and Services Sep. 29, 1986, Tokyo,JP 6 pgs.
Brockmann, Final Office Action, U.S. Appl. No. 13/668,004, Jul. 16, 2014, 20 pgs.
Brockmann, Final Office Action, U.S. Appl. No. 13/686,548, Sep. 24, 2014, 13 pgs.
Brockmann, Office Action, U.S. Appl. No. 13/686,548, Mar. 10, 2014, 11 pgs.

(56) References Cited

OTHER PUBLICATIONS

Brockmann, Office Action, U.S. Appl. No. 13/668,004, Dec. 23, 2013, 9 pgs.
Brockmann, Final Office Action, U.S. Appl. No. 13/438,617, Oct. 3, 2014, 19 pgs.
Brockmann, Office Action, U.S. Appl. No. 13/438,617, May 12, 2014, 17 pgs.
Brockmann, Final Office Action, U.S. Appl. No. 12/443,571, Mar. 7, 2014, 21 pgs.
Brockmann, Office Action, U.S. Appl. No. 12/443,571, Jun. 5, 2013, 18 pgs.
Brockmann, Office Action, U.S. Appl. No. 12/443,571, Nov. 5, 2014, 26 pgs.
Chang, Shih-Fu, et al., "Manipulation and Compositing of MC-DOT Compressed Video," IEEE Journal on Selected Areas of Communications, Jan. 1995, vol. 13, No. 1, 11 pgs. Best Copy Available.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. Appl. No. 12/035,236, Jun. 11, 2014, 14 pgs.
Gordon, Final Office Action, U.S. Appl. No. 12/035,236, Jul. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.

Insight advertisement, "In two years this is going to be the most watched program on TV" On touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report / Written Opinion, PCT/US2008/000400, Jul. 14, 2009, 10 pgs.
ICTV, Inc., International Search Report / Written Opinion, PCT/US2008/000450, Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001, http://mpeg.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs. Best Copy Available.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, Sep. 2, 2014, 8 pgs.
Regis, Notice of Allowance U.S. Appl. No. 13/273,803, May 14, 2014, 8 pgs.
Regis, Final Office Action U.S. Appl. No. 13/273,803, Oct. 11, 2013, 23 pgs.
Regis, Office Action U.S. Appl. No. 13/273,803, Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, Sep. 22, 2014, 5 pgs.
Sigmon, Notice of Allowance, U.S. Appl. No. 13/311,203, Feb. 27, 2014, 14 pgs.
Sigmon, Final Office Action, U.S. Appl. No. 13/311,203, Sep. 13, 2013, 20 pgs.
Sigmon, Office Action, U.S. Appl. No. 13/311,203, May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceed-

(56) References Cited

OTHER PUBLICATIONS ings of the 1998 IEEE International Symposium on Monterey, CA, USA May 31-Jun. 3, 1998, New York, NY, USA,IEEE, US, May 31, 1998, 4 pgs.
Stoll, G. et al., "GMF4iTV: Neue Wege zur-lnteraktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks Inc., International Search Report and Written Opinion, PCT/U52013/036182, Jul. 29, 2013, 12 pgs.
AC-3 digital audio compression standard, Extract, Dec. 20, 1995, 11 pgs.
ActiveVideo Networks BV, International Preliminary Report on Patentability, PCT/NL2011/050308, Sep. 6, 2011, 8 pgs.
ActiveVideo Networks BV, International Search Report and Written Opinion, PCT/NL2011/050308, Sep. 6, 2011, 8 pgs.
Activevideo Networks Inc., International Preliminary Report on Patentability, PCT/US2011/056355, Apr. 16, 2013, 4 pgs.
ActiveVideo Networks Inc., International Preliminary Report on Patentability, PCT/US2012/032010, Oct. 8, 2013, 4 pgs.
ActiveVideo Networks Inc., International Search Report and Written Opinion, PCT/US2011/056355, Apr. 13, 2012, 6 pgs.
ActiveVideo Networks Inc., International Search Report and Written Opinion, PCT/US2012/032010, Oct. 10, 2012, 6 pgs.
ActiveVideo Networks Inc., International Search Report and Written Opinion, PCT/US2013/020769, May 9, 2013, 9 pgs.
ActiveVideo Networks, Inc., International Search Report and Written Opinion, PCT/US2009/032457, Jul. 22, 2009, 7 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, Dec. 23, 2010, 8 pgs.
Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 1, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008, 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action U.S. Appl. No. 11/178,177, Mar. 29, 2011, 15 pgs.
Craig, Office Action, U.S. Appl. No. 11/178,177, Aug. 3, 2011, 26 pgs.
Craig, Office Action, U.S. Appl. No. 11/178,177, Mar. 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.

(56) References Cited

OTHER PUBLICATIONS

Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.
Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.
ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Imases, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 1, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks, Inc., International Preliminary Report on Patentablity, PCT/US2013/036182, Oct. 14, 2014, 9 pgs.
ActiveVideo Networks Inc., Communication Pursuant to Rule 94(3), EP08713106-6, Jun. 25, 2014, 5 pgs.
ActiveVideo Networks Inc., Communication Pursuant to Rule 94(3), EP09713486.0, Apr. 14, 2014, 6 pgs.

(56) References Cited

OTHER PUBLICATIONS

ActiveVideo Networks Inc., Communication Pursuant to Rules 161(2) & 162 EPC, EP13775121.0, Jan. 20, 2015, 3 pgs.
ActiveVideo Networks Inc., Decision to refuse a European patent application (Art. 97(2) EPC, EP09820936.4, Feb. 20, 2015, 4 pgs.
ActiveVideo Networks Inc., Communication Pursuant to Article 94(3) EPC, 10754084.1, Feb. 10, 2015, 12 pgs.
ActiveVideo Networks Inc., Communication under Rule 71(3) EPC, Intention to Grant, EP08713106.6, Feb. 19, 2015, 12 pgs.
ActiveVideo Networks Inc., Notice of Reasons for Rejection, JP2013-509016, Dec. 24, 2014 (Received Jan. 14, 2015), 11 pgs.
ActiveVideo Networks Inc., Notice of Reasons for Rejection, JP2014-100460, Jan. 15, 2015, 6 pgs.
ActiveVideo Networks Inc., Certificate of Patent JP5675765, Jan. 9, 2015, 3 pgs.
Brockmann, Office Action, U.S. Appl. No. 13/668,004, Feb. 26, 2015, 17 pgs.
Brockmann, Office Action, U.S. Appl. No. 13/737,097, Mar. 16, 2015, 18 pgs.
Brockmann, Notice of Allowance, U.S. Appl. No. 14/298,796, Mar. 18, 2015, 11 pgs.
Brockmann, Office Action, U.S. Appl. No. 13/686,548, Jan. 5, 2015, 12 pgs.
Brockmann, Office Action, U.S. Appl. No. 13/911,948, Dec. 26, 2014, 12 pgs.
Brockmann, Office Action, U.S. Appl. No. 13/911,948, Jan. 29, 2015, 11 pgs.
Craig, Decision on Appeal -Reversed-, U.S. Appl. No. 11/178,177, Feb. 25, 2015, 7 pgs.
Craig, Notice of Allowance, U.S. Appl. No. 11/178,177, Mar. 5, 2015, 7 pgs.
Craig, Notice of Allowance, U.S. Appl. No. 11/178,181, Feb. 13, 2015, 8 pgs.
Dahlby, Office Action, U.S. Appl. No. 12/651,203, Dec. 13, 2014, 19 pgs.
Gordon, Notice of Allowance, U.S. Appl. No. 12/008,697, Dec. 8, 2014, 10 pgs.
Gordon, Office Action, U.S. Appl. No. 12/008,722, Nov. 28, 2014, 18 pgs.
Regis, Notice of Allowance, U.S. Appl. No. 13/273,803, Nov. 18, 2014, 9 pgs.
Regis, Notice of Allowance, U.S. Appl. No. 13/273,803, Mar. 2, 2015, 8 pgs. from 5024.
Sigmon, Notice of Allowance, U.S. Appl. No. 13/311,203, Dec. 19, 2014, 5 pgs.
Tag Networks Inc, Decision to Grant a Patent, JP 2008-506474, Oct. 4, 2013, 5 pgs.
ActiveVideo Networks Inc. Extended EP Search RPT, Application No. 09820936-4, Oct. 26, 2012, 11 pgs.
ActiveVideo Networks Inc. Extended EP Search RPT, Application No. 10754084-1, Jul. 24, 2012, 11 pgs.
ActiveVideo Networks Inc. Extended EP Search RPT, Application No. 10841764.3, May 20, 2014, 16 pgs.
ActiveVideo Networks Inc. Extended EP Search RPT, Application No. 11833486.1, Apr. 3, 2014, 6 pgs.
ActiveVideo Networks Inc. Extended EP Search RPT, Application No. 13168509.1, Apr. 24, 2014, 10 pgs.
ActiveVideo Networks Inc. Extended EP Search RPT, Application No. 13168376-5, Jan. 23, 2014, 8 pgs.
ActiveVideo Networks Inc. Extended EP Search RPT, Application No. 12767642-7, Aug. 20, 2014, 12 pgs.
Gordon, Notice of Allowance, U.S. Appl. No. 12/008,697, Apr. 1, 2015, 10 pgs.
Sigmon, Notice of Allowance, U.S. Appl. No. 13/311,203, Apr. 14, 2015, 5 pgs.

\* cited by examiner

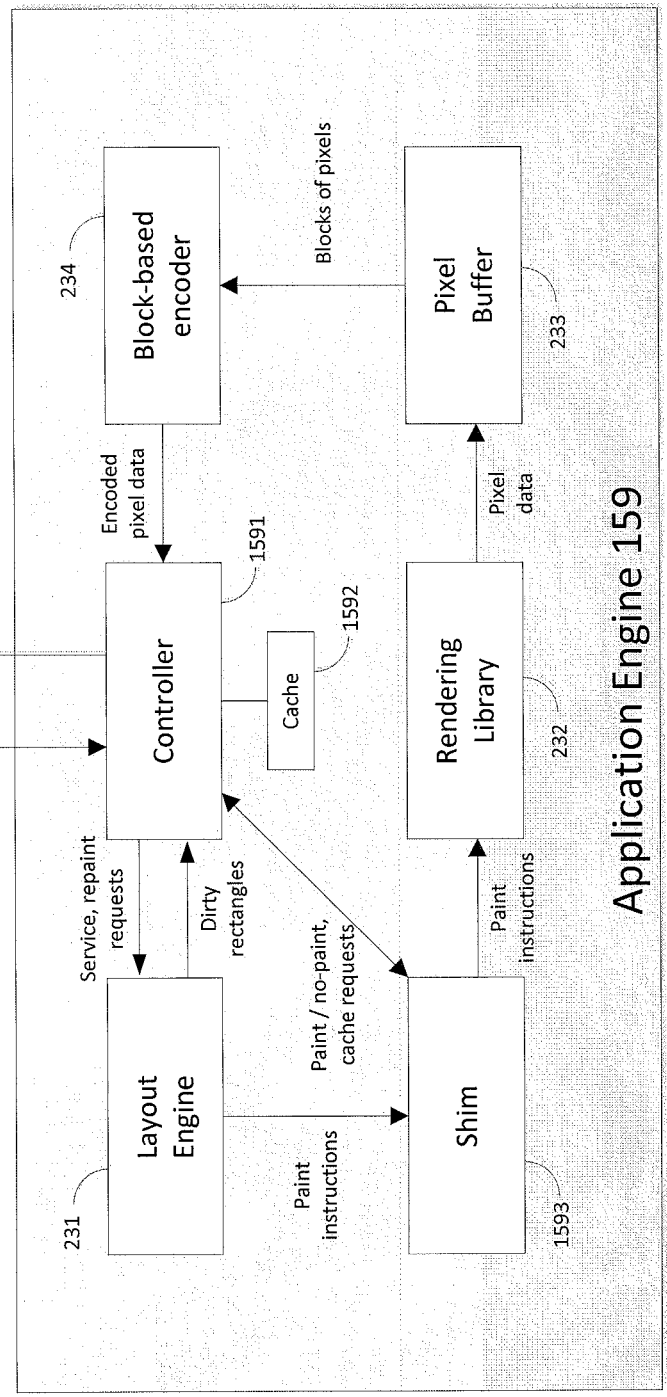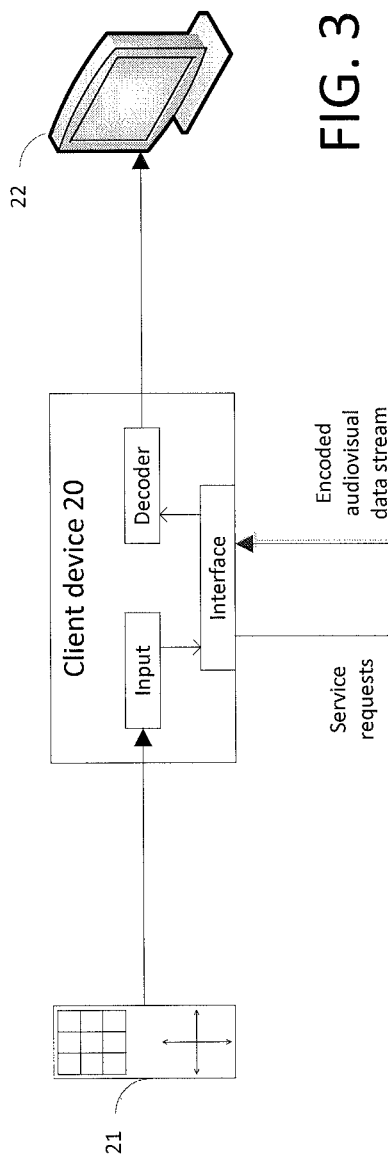
FIG. 3

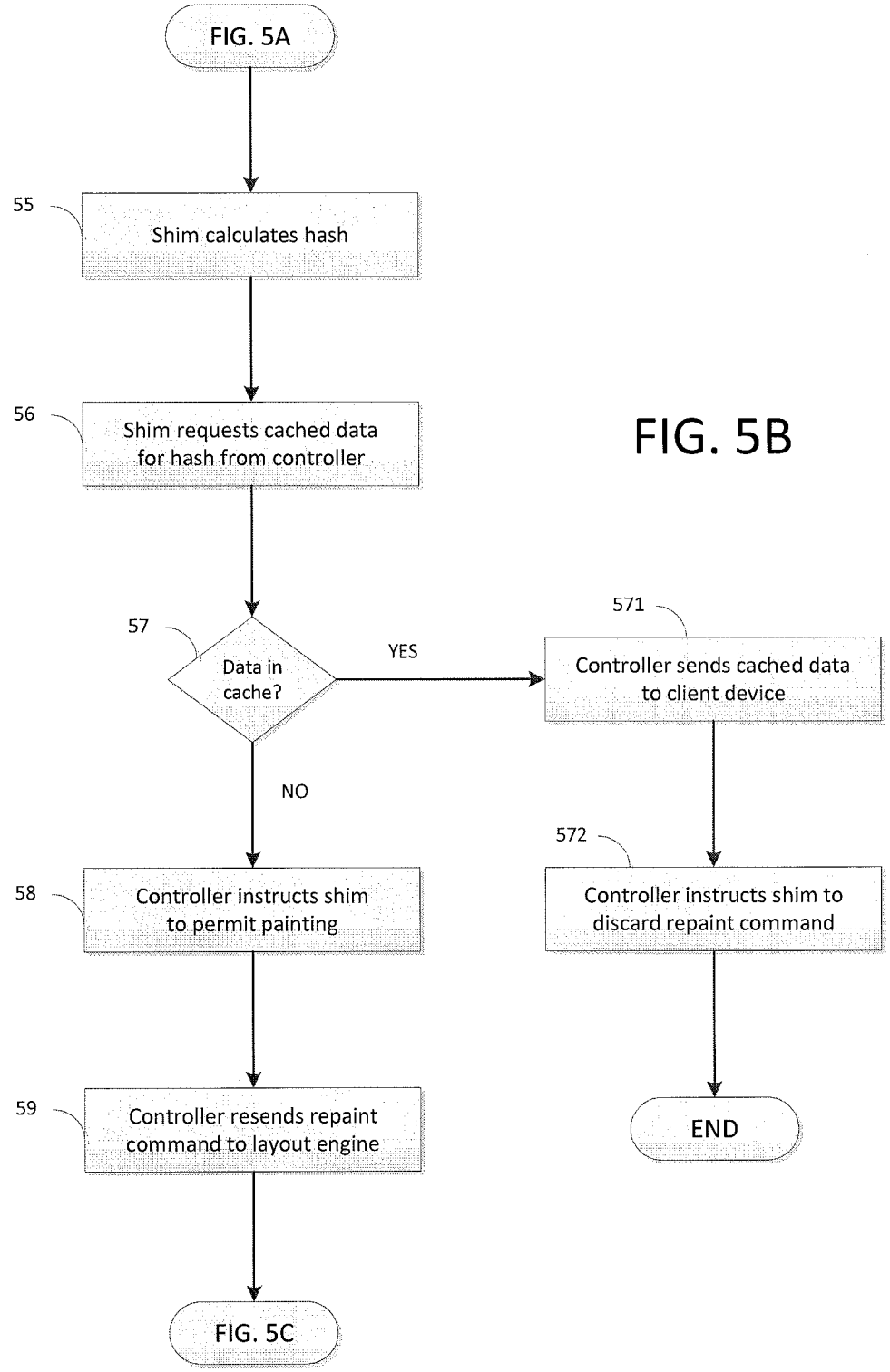

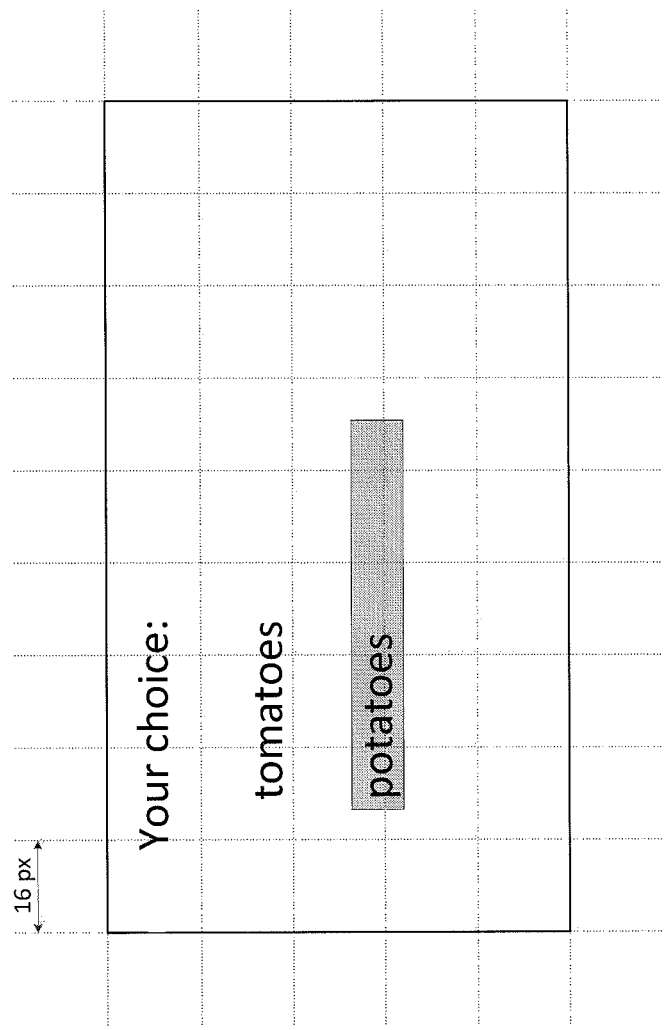

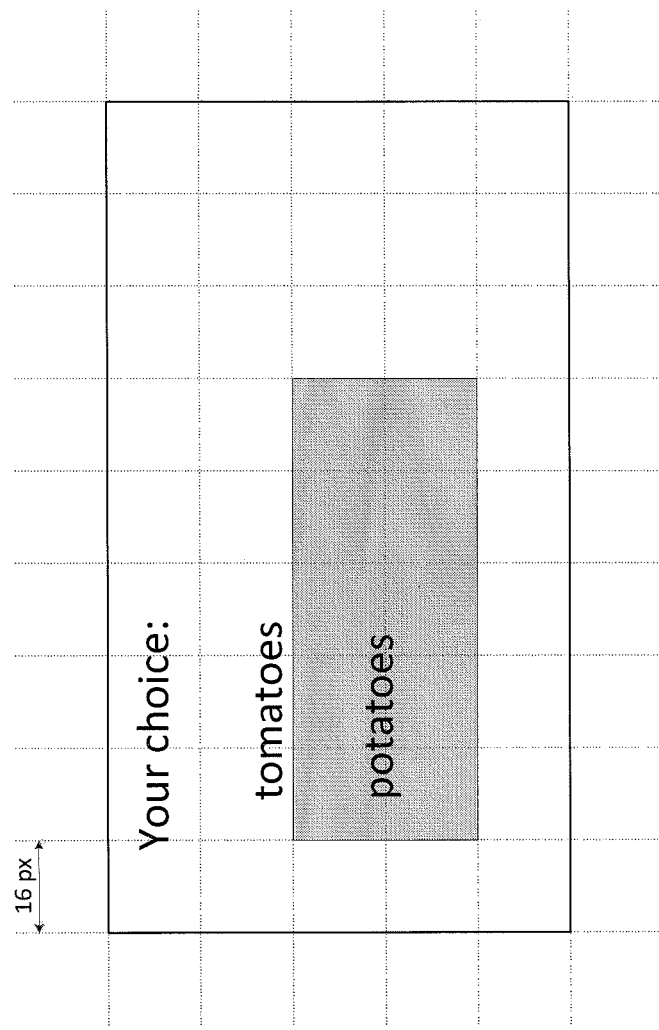

GRAPHICAL APPLICATION INTEGRATION WITH MPEG OBJECTS

TECHNICAL FIELD

The present invention relates to computer graphics display memory systems and methods, and more particularly to providing a graphical user interface having cached graphical elements.

BACKGROUND ART

Content providers are experiencing a growth in demand for interactive applications, such as interactive menus, games, web browsing, and the like. Each such interactive application must provide an output that is tailored to the individual requesting it. This is done by establishing a session between the content provider and a client device over a data network, for example the Internet or a cable television system. Furthermore, the audiovisual data for each application is typically encoded or compressed according to an encoding scheme, such as MPEG, to reduce the amount of data that must be transferred. However, encoding audiovisual data for transmission over such a data network is computationally expensive. As the number of requests for interactive sessions grows, it becomes problematic to both render and encode the output of a large number of application sessions, each output destined for a different viewer.

It is known in the art to reuse audiovisual content by caching it. In this way, a frame of video content may be produced once, and sent to as many client devices as required. However, many applications generate reusable images that are smaller than a full frame of video. For example, a menuing application may generate a pulsating menu button animation, or a video game may draw a spaceship image at nearly any location on the screen. Prior art systems must re-render and re-encode these sub-frame images for each video frame produced. Caching mechanisms cannot be used, because the encoding process often uses a state-based data compression system that does not permit insertion of images into an existing data stream. As rendering and encoding are computationally expensive operations, prior art systems require a large hardware and software investment to keep up with demand.

SUMMARY OF ILLUSTRATED EMBODIMENTS

To solve the aforementioned problems, various embodiments of the present invention permit caching of encoded or compressed images that can be composited together with an audiovisual data source. In particular, for each application that defines a graphical user interface, various embodiments insert a small software hook, or shim, between layers in the application execution environment that intercepts rendering commands and determines whether the image to be rendered is already cached in an encoded state. If so, the encoded image is inserted into the video without being completely decoded and re-encoded. Slice cutting and slice linking techniques as separately disclosed herein may be used to accomplish such an insertion.

Thus, in a first embodiment there is given a method of providing an image to a client device from an application execution environment having a layout engine that assembles graphical components into a graphical user interface screen for a graphical application, and a rendering library that renders graphical components into pixels. The method includes receiving, from the layout engine, one or more paint instructions having parameters that pertain to a given graphical object. Next, the method requires computing a hash value based on the received one or more paint instructions. There are two paths, depending on whether the hash value is contained within a cache memory. If so, the method calls for retrieving, from the cache, encoded audiovisual data that are uniquely associated with the hash value, and transmitting the retrieved audiovisual data to the client device. If not, the method requires several more steps. The first such step is forwarding the received one or more paint instructions to the rendering library for rendering the graphical object into pixels according to the paint instruction. The second such step is encoding the rendered pixels into encoded audiovisual data. The third such step is storing the hash value and the encoded audiovisual data in the cache, whereby the hash value and the encoded audiovisual data are uniquely associated. Finally, the fourth such step is transmitting the encoded audiovisual data to the client device. Determining that the hash value is contained within the cache may be done by comparing the hash value to a stored hash value of a cached image that forms part of an animation.

The client device may be a television, a television set-top box, a tablet computer, a laptop computer, a desktop computer, or a smartphone. The graphical application may be, for example, a web browser or a menu interface.

Encoding may include dividing the screen into blocks of pixels. In one such related embodiment, the method may be extended, after receiving the painting data and before computing the hash value, by determining the smallest rectangle consisting of whole blocks of pixels that surrounds the at least one graphical object; requesting that the layout engine repaint the smallest surrounding rectangle; and receiving, from the layout engine, second painting data that include at least one paint instruction having parameters that reflect the smallest surrounding rectangle, wherein computing the hash value is based on the second painting data.

In a separate related embodiment, the method may be extended by determining the smallest rectangle consisting of whole blocks of pixels that surrounds the at least one graphical object; copying current image data into a pixel buffer having the size and shape of the smallest surrounding rectangle; and requesting that the rendering library render the graphical object into the pixel buffer according to the painting data, wherein computing the hash value is based on the pixel data in the pixel buffer.

Sometimes an interactive application will provide a repeating sequence of images that forms an animation, and images in the sequence may benefit from other optimizations. For example, regarding these sequences of images as an animation allows motion detection to be performed, resulting in much more efficient inter-encoding (e.g., producing P-frames and B-frames). This increase in efficiency may manifest as, for example, a lower bandwidth required to transmit a video that includes the animation, or a higher quality for the same bandwidth.

Thus, in a second embodiment there is provided a method of transmitting, to a client device, images that comprise an animation. The method requires first receiving a current image into a computing processor. As with the first method embodiment, there are two paths. When the current image is identical to a previously rendered image, the previously rendered image being uniquely associated with an encoded image in a cache memory, the method concludes by transmitting to the client device the cached, encoded image without encoding the current image. However, when the current image is not identical to a previously rendered image, but shares at least a given minimum percentage of its pixels with a given, previously rendered image, the method continues with a number of additional steps. The first such step is identifying the current image and the given, previously rendered image as belonging to a common animation. The second such step is encoding the current image according to a predictive encoding scheme. The third such step is storing the encoded current image in the cache memory. The fourth such step is transmitting to the client device the encoded current image.

The predictive encoding scheme may be an MPEG encoding scheme. The previously rendered image may not have been rendered immediately previously to the current image, but may be an image rendered earlier. The previously rendered image may be uniquely associated with a predictively encoded image in the cache memory. This second method may be extended by computing a hash value for each unique chain of images that forms an animation, the hash value being a function of all images in the chain of images and a screen displacement between two consecutive images in the chain.

On occasion, it is more efficient to form a row of encoded data by combining currently-displayed visual data with newly rendered rectangles or animations than it is to re-render and re-encode an entire screen. Thus, it is necessary to develop methods for cutting rows of the currently-displayed data into slices, and methods for combining slices of data together again to form whole rows.

Therefore, in a third embodiment there is provided a method of forming two encoded slices from data comprising a given encoded slice, each encoded slice comprising a sequence of macroblocks that are encoded according to a variable length code. This method includes locating, in the given slice, a location of a macroblock. Then, the method requires altering a DC luma value or a DC chroma value of the located macroblock without fully decoding the macroblock according to the variable length code. The first formed slice consists of the data of the given slice up to but not including the altered macroblock, and the second formed slice consists of the encoded macroblock and any subsequent encoded macroblocks in the given slice. Altering the DC luma value or the DC chroma value may be performed through a bit-shifting operation.

Further, in a fourth embodiment there is provided a method of combining a first encoded slice and a second encoded slice to form a third encoded slice, each encoded slice comprising a sequence of macroblocks that are encoded according to a variable length code. The method first requires altering a DC luma value or a DC chroma value in the first macroblock of the second slice without fully decoding the macroblock according to the variable length code. The method ends by concatenating the data of the first slice with the altered macroblock and the undecoded data of the second slice to form the third encoded slice. As before, altering the DC luma value or the DC chroma value may be performed through a bit-shifting operation.

It is contemplated that the invention may be embodied in a tangible medium on which is stored non-transitory computer program code for performing any of the above methods.

It is also contemplated that the invention may be embodied in a system for providing an image to a client device from an application execution environment having a layout engine that assembles graphical components into a graphical user interface screen for a graphical application, and a rendering library that renders graphical components into pixels. The system may include a memory. The system may also include a shim comprising hardware or a combination of hardware and software that is configured to: receive, from the layout engine, one or more paint instructions having parameters that pertain to a given graphical object, compute a hash value based on the received one or more paint instructions, and, when the hash value is not contained within the memory, forward the received one or more paint instructions to the rendering library for rendering the graphical object into pixels according to the one or more paint instructions. The system may also include a controller comprising hardware or a combination of hardware and software that is configured to: retrieve, from the memory, encoded audiovisual data that are uniquely associated with the hash value, and transmit the retrieved audiovisual data to the client device when the hash value is contained within the memory; and transmit, to the client device, encoded audiovisual data comprising a rendering of the graphical object into pixels according to the received one or more paint instructions when the hash value is not contained within the memory.

The client device may be a television, a television set-top box, a tablet computer, a laptop computer, a desktop computer, or a smartphone. The graphical application may be, for example, a web browser or a menu interface. The memory may store a sequence of images that collectively form an animation, in which case the controller is further configured to determine that the hash value is contained within the cache by comparing the hash value to a stored hash value of a cached image that forms part of the animation. The audiovisual data may be encoded according to an MPEG encoding scheme.

The system may also include a block-based encoder that is configured to form two encoded MPEG slices from data comprising a given encoded MPEG slice, each encoded MPEG slice comprising a sequence of encoded macroblocks. Forming the slices may be performed by locating, in the given MPEG slice, a location of a macroblock that is encoded according to a variable length code; then decoding the encoded macroblock according to the variable length code; then altering a DC luma value in the decoded macroblock; and finally encoding the altered macroblock according to the variable length code, wherein the first formed MPEG slice consists of the data of the given MPEG slice up to but not including the encoded macroblock, and the second formed MPEG slice consists of the encoded macroblock and any subsequent encoded macroblocks in the given MPEG slice.

The system may also include a block-based encoder that is configured to combine a first encoded MPEG slice and a second encoded MPEG slice to form a third encoded MPEG slice, each encoded MPEG slice comprising a sequence of encoded macroblocks. Combining the slices may be performed by decoding the first macroblock of the second slice according to a variable length code; then altering a DC luma value in the decoded macroblock; then encoding the altered macroblock according to the variable length code; and finally concatenating the data of the first slice with the encoded macroblock and the undecoded data of the second slice to form the third slice.

BRIEF DESCRIPTION OF THE DRAWINGS

The foregoing features of embodiments will be more readily understood by reference to the following detailed description, taken with reference to the accompanying drawings, in which:

FIG. 3 is a block diagram showing functional modules and data flow in accordance with an embodiment of the invention;

FIGS. 5A-5C collectively comprise a flowchart showing a method of generating a screen update in accordance with the embodiment of FIG. 4;

FIGS. 6A-6D show an exemplary screen area that is being updated at various stages of the methods of FIGS. 4 and 5;

DETAILED DESCRIPTION OF SPECIFIC EMBODIMENTS

Definitions

Figure 1:
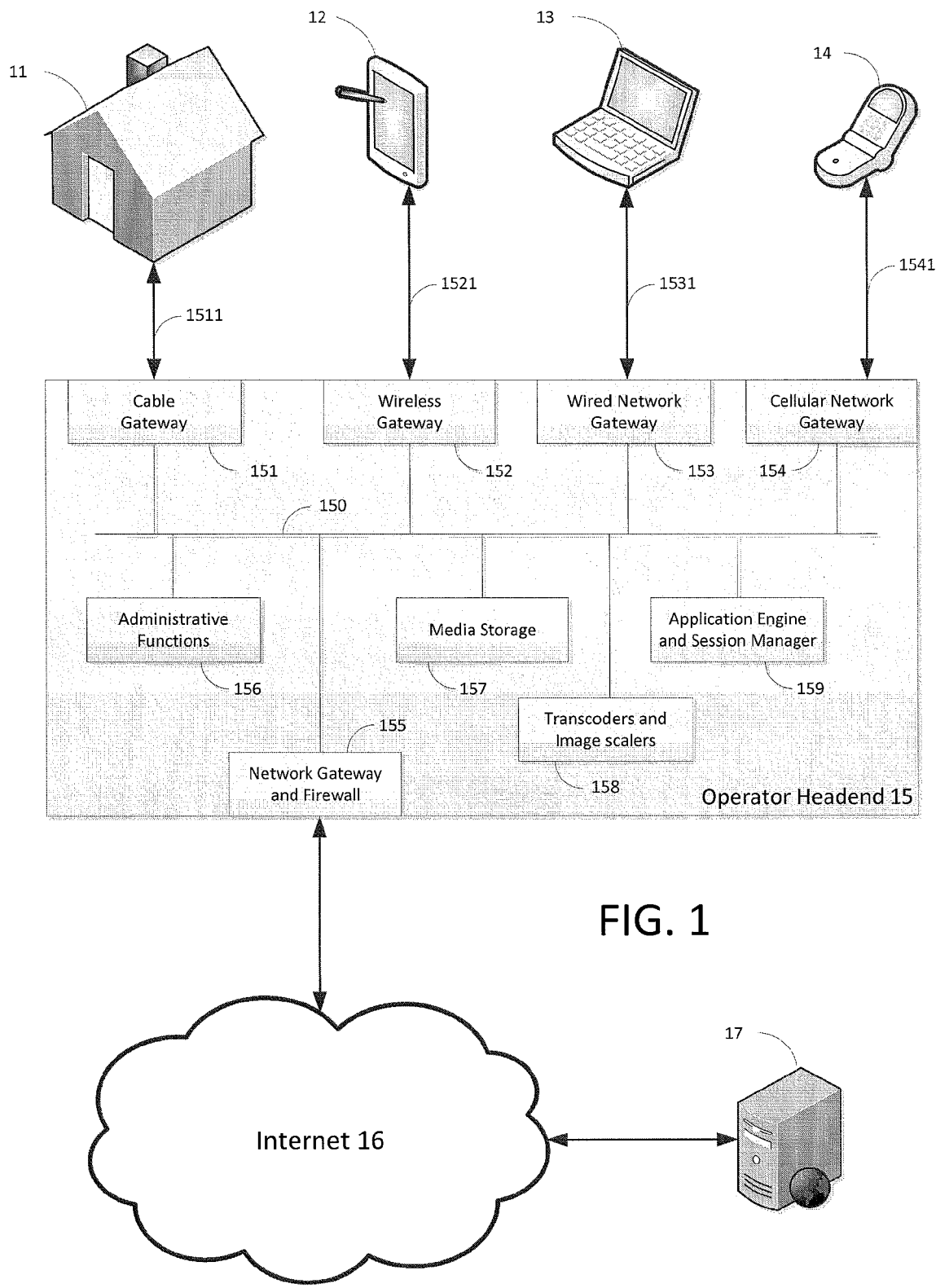
FIG. 1 is a schematic diagram of a typical system in which various embodiments of the invention may be used.

As used in this description and the accompanying claims, the following terms shall have the meanings indicated, unless the context otherwise requires:

The term "application" refers to an executable program, or a listing of instructions for execution, that defines a graphical user interface ("GUI") for display on a display device. An application may be written in a declarative language such as HTML or CSS, a procedural language such as C, JavaScript, or Perl, any other computer programming language, or a combination of languages.

A "rectangle" is a rectangular area on a screen of the display device. The screen area may in fact reside within a window in a windowed user interface.

A rectangle is "clean" if its contents match what is currently being output to the display device, and "dirty" if its contents do not match what is currently being output.

A "layout engine" is a computing service that is used to convert a document into graphical objects placed on a display screen. For example, Trident, WebKit, and Gecko are software layout engines that convert web pages into a collection of graphical objects (text strings, images, and so on) arranged, according to various instructions, within a page display area of a web browser. The instructions may be static, as in the case of parts of HTML, or dynamic, as in the case of JavaScript or other scripting languages, and the instructions may change as a function of user input. Trident is developed by Microsoft Corporation and used by the Internet Explorer web browser; WebKit is developed by a consortium including Apple, Nokia, Google and others, and is used by the Google Chrome and Apple Safari web browsers; Gecko is developed by the Mozilla Foundation, and is used by the Firefox web browser.

A "rendering library" is a computing service that is used by a layout engine to convert graphical objects into images. Graphical objects include, without limitation, alphanumeric symbols, shapes such as circles and rectangles, and images defined according to an image format such as GIF or JPEG. For example, Cairo is a software rendering library that converts two-dimensional objects defined using vector graphics into either pixel data or into drawing commands for underlying graphical systems such as X Windows, the Windows 32-bit graphics device interface, or OpenGL. Cairo is developed by Carl Worth of Intel Corporation, Behdad Esfahbod of Google (Waterloo, Canada), and a host of others.

A "pixel buffer" is a data buffer used to temporarily store the pixel data of a screen rectangle.

A "pixel hash" is a hash value that is calculated over all pixels in a pixel buffer.

A "repaint request" is a request from a controller to a layout engine to repaint the contents of a rectangle for output. Repaint requests may be used to "clean" a dirty rectangle.

A "graphical object" is a collection of data that permits a shape to be drawn on a display. For example, a graphical object that represents a square may include data pertaining to coordinates of the square's vertices, a line thickness, a line color, and so on. A graphical object that represents a text character may include data pertaining to a font name, a letter height, a color, a font weight, and so on. A graphical object may contain other graphical objects; for example, a text string may include a number of letters.

A "paint instruction" is an instruction from the layout engine to a rendering library to generate pixel data, in a pixel buffer, that relates to a given graphical object.

A "paint hash" is a hash value that is calculated as a function of a sequence of paint instructions that are generated to repaint a rectangle's content, including their parameters (or certain appropriately chosen representations of their parameters).

An "MPEG fragment" is one or more MPEG-encoded macroblocks, as disclosed in U.S. patent application Ser. No. 12/443,571, filed Oct. 1, 2007, the contents of which are incorporated by reference in their entirety.

"Audiovisual data" are data that represent audio, video, or a combination of audio and video.

An "animation" is a repeating sequence of individual images.

A "slice", in the context of video encoding and especially in the context of a H.264/MPEG-4 encoding format, is a group of one or more horizontally contiguous macroblocks, in raster order, that can be encoded independently from other slices according to the encoding format.

FIG. 1 is a schematic diagram of a typical system in which various embodiments of the invention may be used. These embodiments transmit streaming audiovisual data to a variety of client devices for playback, including a smart television, cable set top box, or a desktop computer in house 11, a tablet computer 12, a laptop computer 13, and a smartphone 14. The audiovisual data are typically streamed from an operator headend 15. The operator may obtain content via a public data network, shown here as the Internet 16, from a content provider, shown here as a web server 17. The operator also may obtain the content from an operator-controlled web server via a private data network.

The operator headend 15 is connected to each of the various client devices via a gateway. Thus, the headend is connected to house 11 through a cable gateway 151, which may be, for example, a cable modem termination system for terminating a cable system 1511. The headend is connected to the tablet computer 12 via a wireless gateway 152, such as an antenna, that transmits and receives on a wireless data network 1521. The headend is connected to the laptop computer 13 via a wired network gateway 153, such as a router, that uses a wired data network 1531. And the headend is connected to the smartphone 14 via a cellular network gateway 154 that uses a cellular telephone network 1541. Similarly, the headend is connected to the Internet 16 via a network gateway 155 (which typically includes a firewall, as indicated, to prevent unauthorized access). The headend may be connected to other client devices known in the art using similar, ordinary means.

All of these gateways are connected, typically via one or more firewalls or data routing devices (not shown), to a central headend data network 150. Also connected to the central network are various other useful headend systems, such as an administrative system 156 and media storage server 157. Various embodiments of the invention are particularly directed to the creation and use of transcoders and image scalers 158, and application engine and session manager 159. These functional components are described in more detail in connection with FIGS. 3-6 below. The administrative functions 157, media storage 157, transcoders and scalers 158, and application engine and session manager 159 may be implemented in software and/or hardware using general purpose computers or special-purpose computing systems. It will be appreciated that any or all of these components may be implemented in parallel to handle large numbers of concurrent users. Thus, for example, a given headend 15 may execute a plurality of transcoder instances, scaler instances, and/or application engine instances at any given time. Moreover, these instances need not be executed within one physical premises, but may be distributed as required by the service provider.

Transcoders may be used to re-encode data from a first data format (such as a broadcast format or storage format) into a second data format (such as a data streaming format). Scalers may be used to dynamically resize video streams, for example to provide a "mosaic" of multiple video streams on a single display. An application engine may be used to run an application having a graphical user interface, such as an HTML page or a web browser, in a user session with a particular client device. Such user sessions may be managed by the session manager.

Typically, a client device forms a data connection to the operator headend and requests a particular interactive service, such as a menuing interface or a web browser. In response, the headend requests a new session from the session manager, and allocates an application engine associated with the requested service. If the particular service requires transcoding or scaling, the session manager will also allocate these resources. The application engine communicates with the client device, and requests transcoding and scaling operations (as well as access to administrative functions 156 such as billing, and stored media 157) to provide an enjoyable interactive experience to a user of the client device. When the service is terminated, either by the headend or the client device, the session manager frees up the allocated resources. In accordance with these processes, many thousands of client devices may be simultaneously supported.

Figure 2:
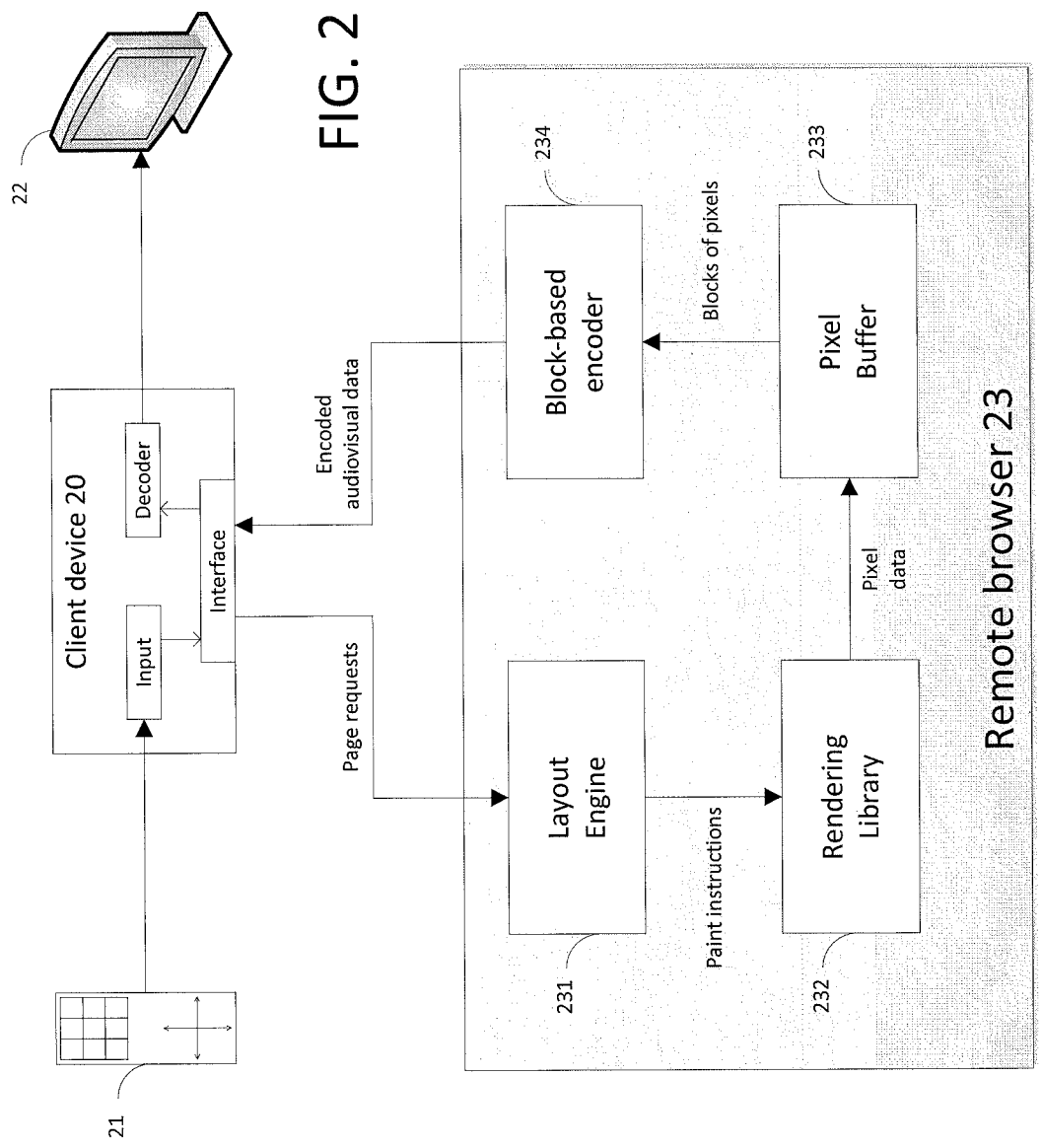
FIG. 2 is a block diagram showing functional modules and data flow in a prior art web browser system.

For purposes of illustration, and not by way of limitation, one service that may be requested is web browsing. FIG. 2 is a block diagram showing functional modules and data flow in a prior art web browser system having a remote browser engine. In this system, a client device 20, such as a cable set top box, is coupled to an input device, such as video keyboard 21, and a display device, such as monitor 22. It will be understood that these components are shown separately for clarity, but they may be integrated into a single form factor, such as a tablet computer or other computing device.

The input device 21 transmits a request for a web page through the client device 20 to a remote browser 23. The remote browser includes four components: a layout engine 231, one or more rendering libraries 232, a pixel buffer 233, and a block-based streaming data encoder 234. The layout engine receives the request and downloads the linked content. This content must be rendered, and when the layout engine wishes to render a graphical object, such as a text string or an image file, it issues one or more paint instructions to a rendering library 232 using an application programming interface (API) for the library. The rendering library then renders the graphical object into a pixel buffer 233 at a location determined by the layout engine.

File formats for encoded image data may be recognized by humans using a (e.g. three or four letter) filename extension such as GIF or JPEG. However, often these extensions are incorrect, so the layout engine may resort to reading a "magic number" inside the file itself at industry-standard byte offsets. Such magic numbers are well known in the art, and their careful management across the industry permits unambiguous identification of file formats by the application execution environment. Correct identification of the file format for an image graphical object permits the layout engine to invoke the proper rendering library 232 to draw its encoded data.

Once the pixel data have been drawn into the pixel buffer 233, the block-based encoder 234 receives blocks of pixels from the buffer and encodes them according to an encoding. Encodings are used to compress the data for transmission, as it is often the case that data transmission capabilities between the remote browser and the client device are limited. One encoding used in the art is the MPEG encoding, although it will be understood that the scope of the invention is not limited only to MPEG. Once the pixel data are encoded, they are transmitted from the remote browser 23 to the client device 20, where they are decoded and displayed on the display 22.

Interactive behavior typically is controlled from the client device as part of a session established between the client device and the remote browser. Further input received from the client device, such as a repeated key press or a held key on a remote control or a keyboard, causes the layout engine to execute any application logic (e.g., JavaScript). If the application logic requires the screen output to change in response to this interactive input, as it often does, the process may begin again as if a new page request (or update request) were received, thereby causing a modified pixel buffer to be encoded and sent to the client device.

Screen Updates

FIG. 3 is a block diagram showing functional modules and data flow in accordance with an embodiment of the invention. As can be seen, the application engine 159 of this embodiment, also referred to as the application execution environment, differs substantially from the remote browser of FIG. 2. Some of the components of the remote browser 23 (i.e., the layout engine 231, rendering library 232, pixel buffer 233, and block-based encoder 234) operate as described above in connection with FIG. 2. However, the application engine 159 adds a controller 1591, a data cache 1592, and a "shim" 1593, that cooperate to perform novel functionality as described below. Therefore, the application engine leverages the functions of the remote browser components 231-234 without modifying them. Because of this design, when newer and improved versions of remote browser components are released by third party developers, this embodiment advantageously may be adapted to integrate with the new components without requiring substantial modification.

The controller 1591 is responsible for controlling and optimizing the encoding of portions of the graphical user interface of an application. For purposes of concreteness, the application execution environment described herein provides a web browser, but the invention may be used with other application engines having modules that interact via an API. The controller receives service requests from a client device 20 and returns encoded audiovisual data.

The controller is coupled to a data cache 1592. This cache stores encoded audiovisual data that may be decoded by the client device 20 for display on a display device 22. For example, and not by way of limitation, the audiovisual data may be encoded according to an MPEG standard. The cached data may include either full frame, intracoded data (I-frames), intercoded data (P-frames, or B-frames) or MPEG fragments as disclosed in U.S. patent application Ser. No. 12/443,571. It will be appreciated that the data cache 1592 may be shared between application engine instances, so that it may be accessed by any number of controllers.

A shim 1593 is a software mechanism that is interposed between the layout engine 231 and the rendering library 232. As described above in connection with FIG. 2, a prior art layout engine sends paint instructions to a rendering library according to the library's API. However, in accordance with the embodiment shown in FIG. 3, the shim intercepts these instructions and processes them. The shim passes some instructions through to the rendering library automatically, so that the instructions appear to have been issued by the layout engine. For example, if the paint instruction modifies a state in the library (e.g., instructs the library to use a particular coordinate system), or obtains information from the rendering library, then the shim forwards the instruction and returns any response to the layout engine. However, the shim may or may not forward certain other paint instructions to the rendering library, such as rendering instructions, depending on whether it is in a 'forwarding' state or a 'non-forwarding' state. The controller instructs the shim as to which of these two states it should have, as described below. By avoiding unnecessary rendering, the shim advantageously saves processing time and memory.

Figure 4:
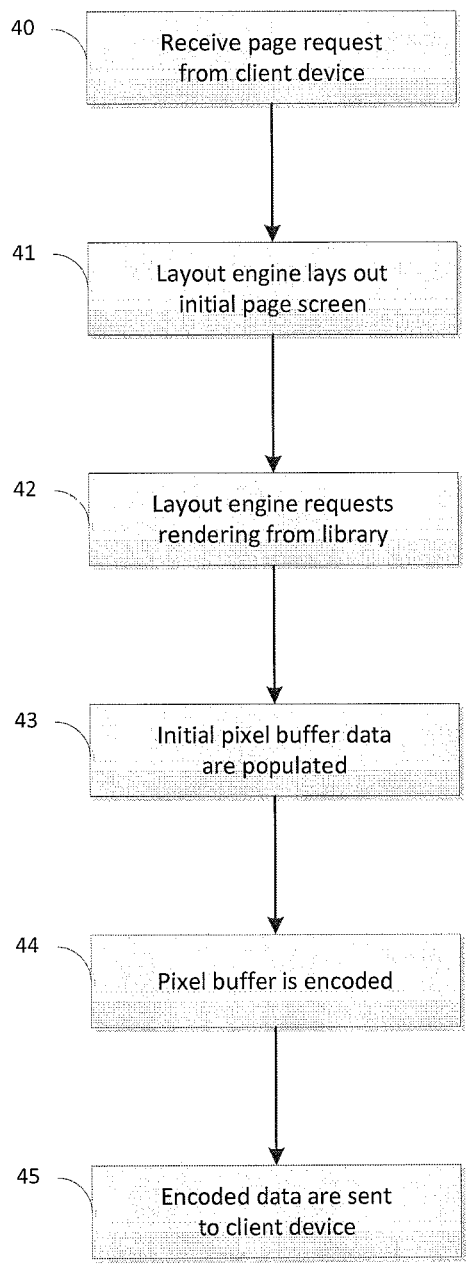
FIG. 4 is a flowchart showing a method of generating an initial screen for a graphical user interface in accordance with an embodiment of the invention.

The operation of the embodiment of FIG. 3 is now explained in more detail with reference to FIGS. 4, 5, and 6. FIG. 4 is a flowchart showing a method of generating an initial screen for a graphical user interface in accordance with an embodiment of the invention. FIGS. 5A-5C collectively comprise a flowchart showing a method of generating a screen update. FIGS. 6A-6D show various screen areas affected by these methods, and FIG. 6E shows an exemplary pixel buffer.

With reference to FIG. 4, a method to generate an initial screen for a client device begin in process 40, in which the controller receives a page request from the client device. This request may be generated, for example, when an individual presses a button on remote control 21, thereby activating the requested application. In process 41, the layout engine (having performed any necessary preprocessing such as retrieving HTML data associated with a URL) determines and positions graphical objects according to methods known in the art. After the data are properly positioned based on their dimensions and other factors, they are rendered in process 42, in which the layout engine requests rendering from one or more rendering libraries. In process 43, the initial pixel buffer data are populated with the drawing outputs of the one or more rendering libraries. In process 44, the pixel buffer data are encoded according to an audiovisual encoding scheme. As known in the art, this scheme may be a block-based encoding scheme such as MPEG. In process 45, the encoded data are sent to the client device 20 for eventual display on display device 22. An example of an initial screen generated as a result of this method is shown in FIG. 6A.

Figure 5A:
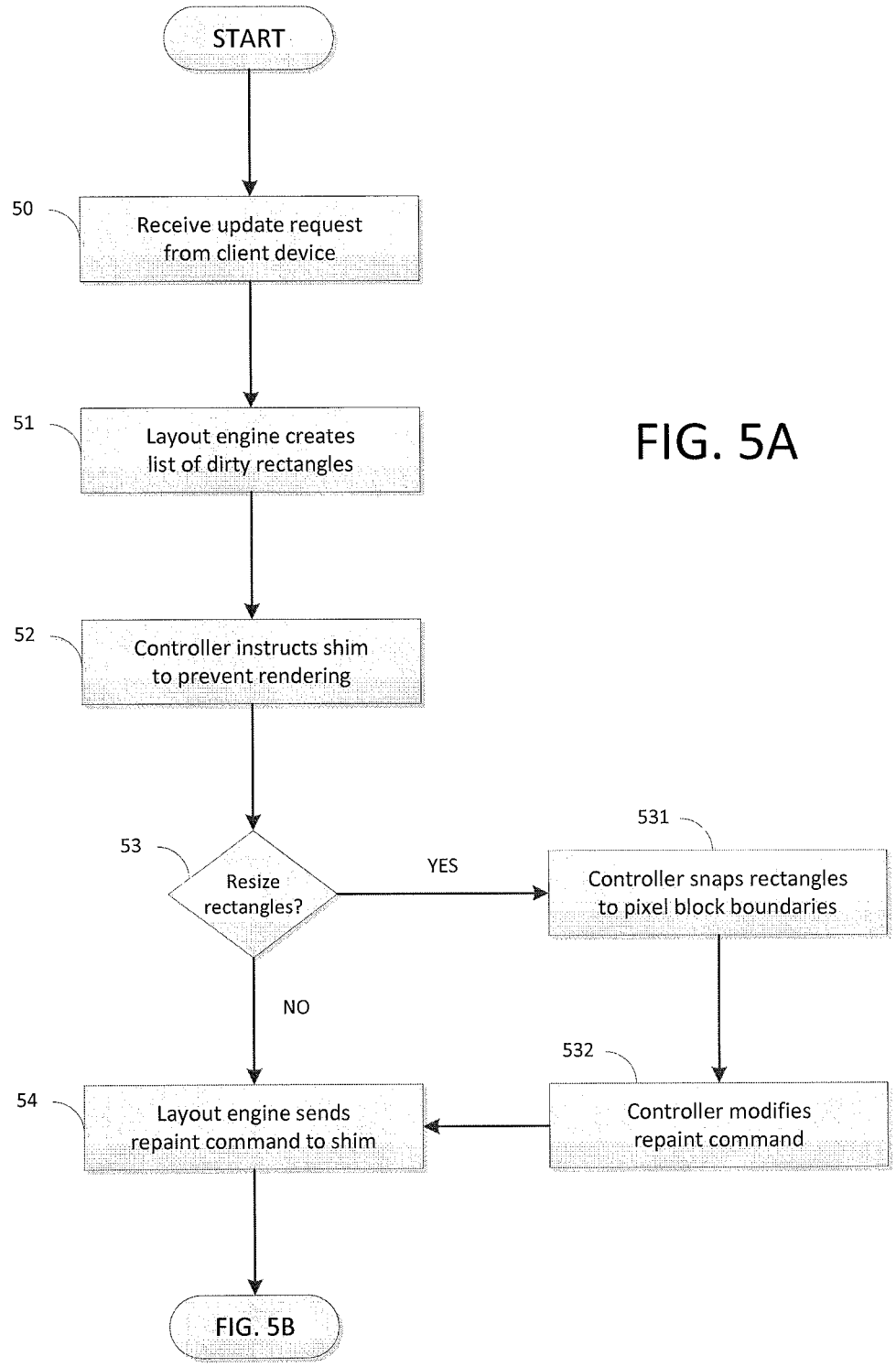
Figure 6A:
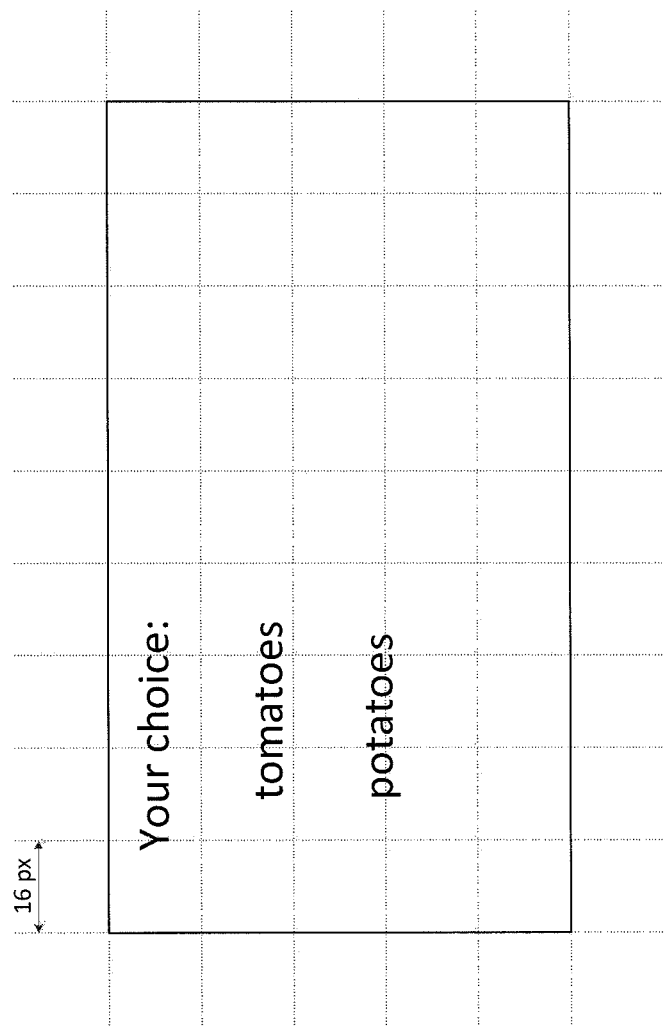
Figure 6B:
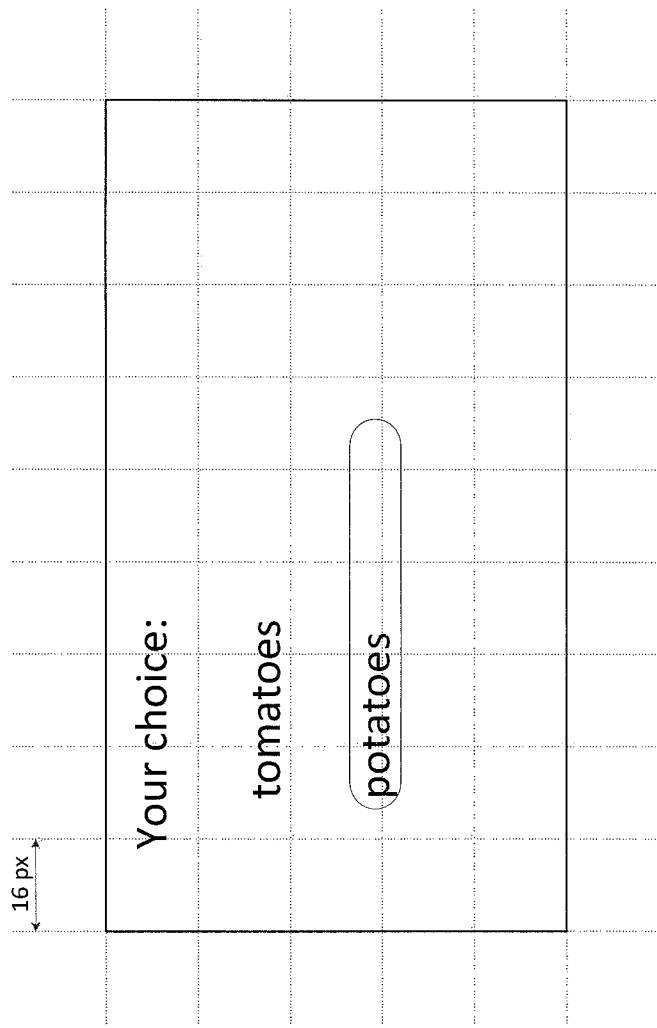
Figure 6E:
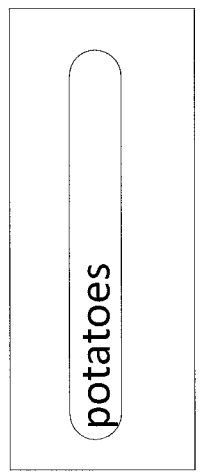
FIG. 6E shows a pixel buffer relating to the exemplary screen area of FIG. 6.

A method of providing a screen update to a client device begins in FIG. 5A. This method may be triggered when an individual activates a control in the graphical user interface that causes a portion of the screen to be updated. The method causes only the portion of the screen to be encoded, and a new image to be transmitted to the client device 20, thereby saving memory and computing resources in the application engine. For encoding schemes other than MPEG, the method potentially saves bandwidth between the application engine and the client device. An example of a screen update request is shown by comparing FIG. 6A to FIG. 6B. FIG. 6A represent an initial screen prompting an individual to choose between tomatoes and potatoes. FIG. 6B represents the desired output of highlighting a button around the "potatoes" element. Highlighting the button is a "screen update" that does not require a full-screen refresh.

The screen update method begins in process 50, in which the application engine receives a screen update request from the client device. Upon receiving the user input, the controller passes it to the layout engine. In process 51, the layout engine creates and returns to the controller a list of dirty rectangles; i.e., rectangular areas of the screen that must be repainted (redrawn) in response to the request. FIG. 6C shows an example of such a dirty rectangle that corresponds to the button of FIG. 6B. This dirty rectangle is the smallest rectangle that may be drawn completely around the affected button. The size and location of dirty rectangles may be determined in accordance with methods known in the art of layout engines.

In process 52, the controller instructs the shim to prevent rendering; that is, to enter the 'non-forwarding' state. Therefore, any rendering paint instructions received by the shim from the layout engine will not be sent to the rendering library.

In process 53, the controller determines whether any rectangles need resizing. This determination is made with knowledge of the size of the blocks of pixels encoded by the block-based encoder. Thus, if the encoder operates on MPEG macroblocks that are 16 pixels by 16 pixels (256 pixels in each block), the controller optionally may determine whether each dirty rectangle is aligned on 16 pixel boundaries. If a rectangle is not so aligned, the controller may determine to resize the dirty rectangles, and proceed to a process 531 in which the controller snaps the rectangles to pixel block boundaries. FIG. 6D shows the dirty rectangle of FIG. 6C, expanded to align with 16 pixel macroblocks. If one or more rectangles were resized, then the controller modifies the received repaint request (or creates a new repaint request) in a process 532, so that the layout engine will cause the proper screen area to be repainted. Thus, in accordance with these optional latter two processes 531, 532, the controller determines the smallest rectangle consisting of macroblocks that surrounds the graphical object being repainted. In this case, the repaint request sent to the layout engine reflects this smallest surrounding rectangle, and the output of the layout engine will include parameters that reflect the smallest surrounding rectangle. The above processes may be performed using a pixel buffer provided by the controller and having the size and shape of the smallest surrounding rectangle, into which current screen image data have been copied, so that any newly rendered image will be drawn on top of the current screen image. Alternately, the above processes may be performed without such a pixel buffer.

Whether or not the controller determines to resize any rectangles, in process 54 the layout engine processes the list of dirty rectangles to produce one or more paint instructions. These instructions have parameters that indicate how the instructions should be executed. For example, the parameters may define the size and coordinates of a dirty rectangle having an image to be re-rendered, and they may define properties of a graphical object, such as a font, weight, and size for a text string. In prior art systems, these instructions would be sent from the layout engine 231 directly to the rendering library 232, but in accordance with this embodiment of the invention, the shim 1593 instead intercepts the instructions.

Continuing the method in FIG. 5B as indicated, recall that the shim is in the 'non-forwarding' state. Thus, in process 55, rather than forwarding the instruction to the rendering library, instead the shim computes a hash value based on the received painting data. This hash value may be computed using a hash function known in the art for producing a small number (a hash) based on a large number according to a computationally inexpensive algorithm that deterministically distributes hash values uniformly and approximately randomly across the set of small output numbers. Because hash values are calculated deterministically, applying the function to the same input twice will yield the same output both times. Because hash values are distributed approximately randomly, applying the function to different inputs will yield different outputs in all but a vanishing number of cases. Thus, hash values are small numbers that may be used to discriminate between large data sets without requiring expensive comparison of the large data sets themselves.

The hash value may be calculated based on the painting data received by the shim, and especially the parameters of at least one paint instruction. In one embodiment, pixel data pertaining to a graphical object are used to produce the hash value. In another embodiment, the hash is calculated as a function of a series of incremental paint instructions that pertain to a particular rectangle. Other variations are contemplated, so long as the hash function is applied uniformly to paint instructions that would result in identical output graphics. Thus, if multiple users of the same menuing interface, accessing the menu at different times, request identical behaviors of the interface, then the same hash value is produced for both users. This is true even if the two users access different application engine instances, and even if some of the parameters (such as a session identifier) are different. Moreover, such identical output graphics could occur at different locations on the screen. For example, a menu button may be rendered at different locations in different menu screens, but otherwise appear identical.

In process 56, the shim transmits the hash value to the controller. The controller 1591 then consults the cache 1592 using the received hash value to determine whether there is an associated entry in the cache. If the data are determined to be in the cache in process 57, then in process 571 the controller immediately retrieves the encoded audiovisual data from the cache, and in process 572 the controller transmits the retrieved data to the client device. Because MPEG does not allow a system to send encoded images that represent less than a full frame to a client device, and because the encoded audiovisual data may represent less than a full frame, the encoded data may be stitched or composited into other encoded data to form a full frame prior to transmission, in accordance with methods known in the art. In process 573, the controller instructs the shim to discard the paint instruction it received from the layout engine, as it is no longer needed.

Thus, if the data are already cached, no further rendering or encoding is necessary to deliver the content to the client device that requested it. If, however, in process 57 the data are determined not to be in the cache, then they must be rendered and encoded. In this case, in process 58 the controller instructs the shim to permit painting (that is, to enter the 'forwarding' state), and in process 59 the controller resends the previous repaint request to the layout engine. At this point, the controller also temporarily stores the received hash value for later use as described below.

Figure 5C:
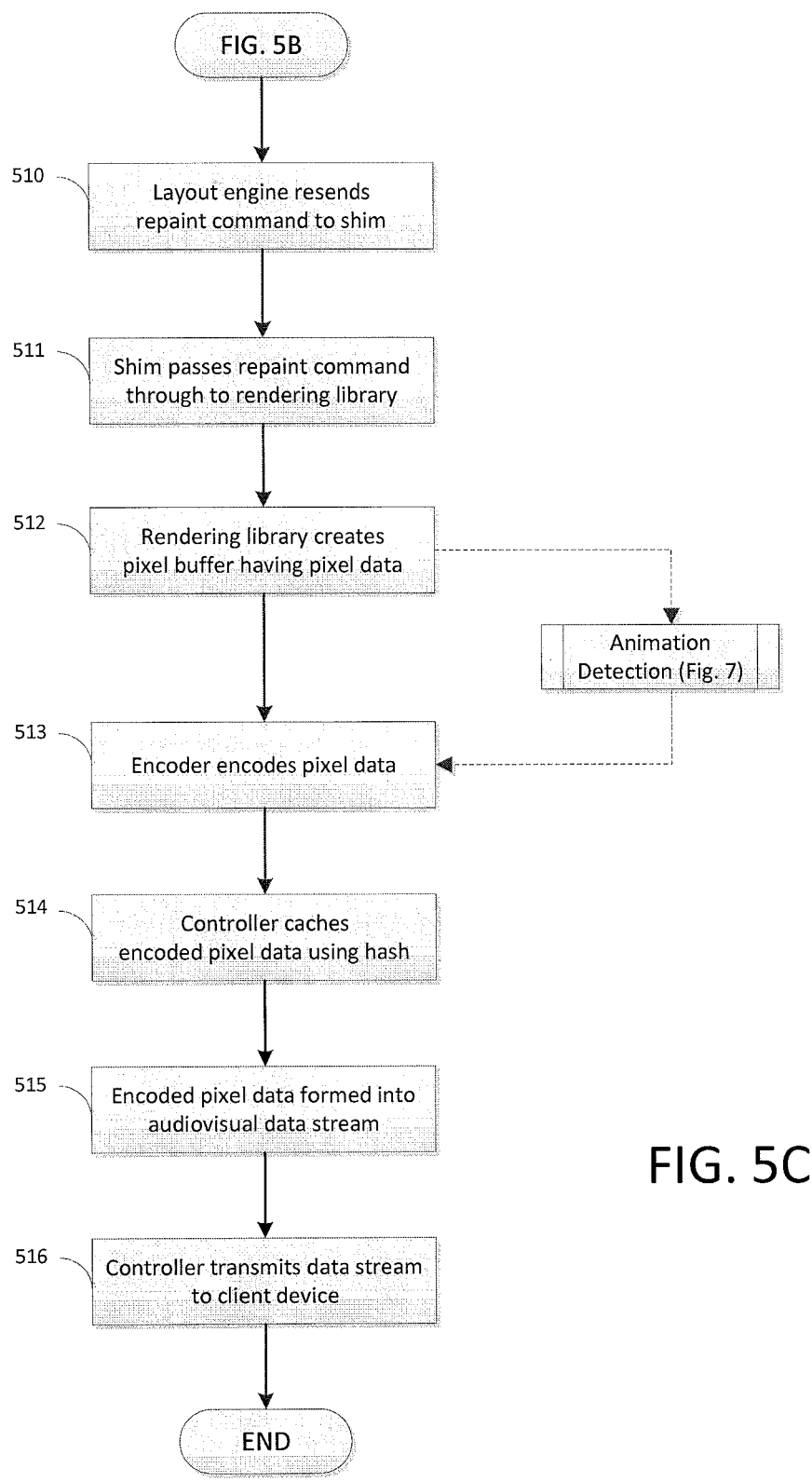

Continuing the process in FIG. 5C as indicated, in process 510 the layout engine resends the repaint request to the shim. Unlike previously, the shim now has been configured to forward the received paint instruction to the rendering library, which it does in process 511. This pass-through effect may be accomplished using the rendering library API in the same manner as the layout engine would if the shim were not present. In process 512, the rendering library creates a pixel buffer having the appropriate pixel data. For example, FIG. 6E shows a pixel buffer associated with the (expanded) dirty rectangle of FIG. 6D. In FIG. 6E, the word "potatoes" is visible along with the button around it. Therefore, this rectangle corresponds to the pixel data (of FIG. 6B) that must be encoded by the encoder.

At this point in the process, an optional animation detection method may be invoked. The purpose of the optional method is to determine whether any optimizations may be made to the encoding process. This optional method is described below in connection with FIG. 7.

In process 513, the encoder encodes the rendered pixel data in the pixel buffer to form encoded audiovisual data. Process 513 may be performed according to methods known in the art, or it may be performed according to methods described in further detail below in connection with detecting and encoding animations, and/or performing slice linking and cutting. In process 514, the controller receives the encoded pixel data and stores it in the screen update cache 1592. These encoded data are stored in unique association with the hash value previously received by the controller in process 56. Thus, if a future screen update request causes the shim 1593 to generate an identical hash value, the encoded data will be available in the cache for immediate retrieval. Next, in process 515, the encoded pixel data are formed into an audiovisual data stream. This process may include generating a continuous stream of frames according to a fixed number of frames per second, in accordance with an industry encoding standard such as MPEG. During this process, any number (zero or more) MPEG fragments may be combined with output from a scaled and/or transcoded input video stream to form the final encoded audiovisual data stream. Finally, in process 516 the controller transmits the encoded audiovisual data stream to the client device. Advantageously, this method does not require an MPEG motion search on the entire displayed screen, but only the "dirty" rectangle that is being updated. The method therefore requires less processing power than in the prior art.

The above method may be modified as follows. In process 58, the shim receives a command from the controller to permit painting. The purpose of this command is to permit the system to render the received painting data. However, these painting data already are stored in the shim. Therefore, in an alternate embodiment, rather than executing processes 59, 510, and 511 (which collectively require a further repaint request being issued to the layout engine), the shim may forward the painting data directly to the rendering library in process 58 upon receiving notification that there was a cache "miss".

The above method also may be modified in a different manner. Some paint instructions read back pixel information from the pixel buffer used by the rendering library. However, the pixel buffer may include incorrect data (i.e., data of a previously rendered image) if the controller and shim bypassed the previous paint instruction because the image was found in the cache. In this case, the cached image may be retrieved, and the shim may either simulate the effect of the paint instruction directly, or update the state of the rendering library to use the retrieved, cached image and then pass the paint instruction to the library for execution. The information read from the pixel buffer might also be cached for later retrieval if a similar sequence of paint commands is issued.

Detecting Animations

According to the embodiments described above, each image is individually compressed in isolation; for example, the images may be compressed using MPEG intra-encoding. However, sometimes an application will provide a repeating sequence of images that forms an animation, and images in the sequence may benefit from other optimizations. For example, regarding these sequences of images as an animation allows motion detection to be performed, resulting in much more efficient inter-encoding (e.g., producing P-frames and B-frames). This increase in efficiency may manifest as, for example, a lower bandwidth required to transmit a video that includes the animation, or a higher quality for the same bandwidth.

Figure 7:
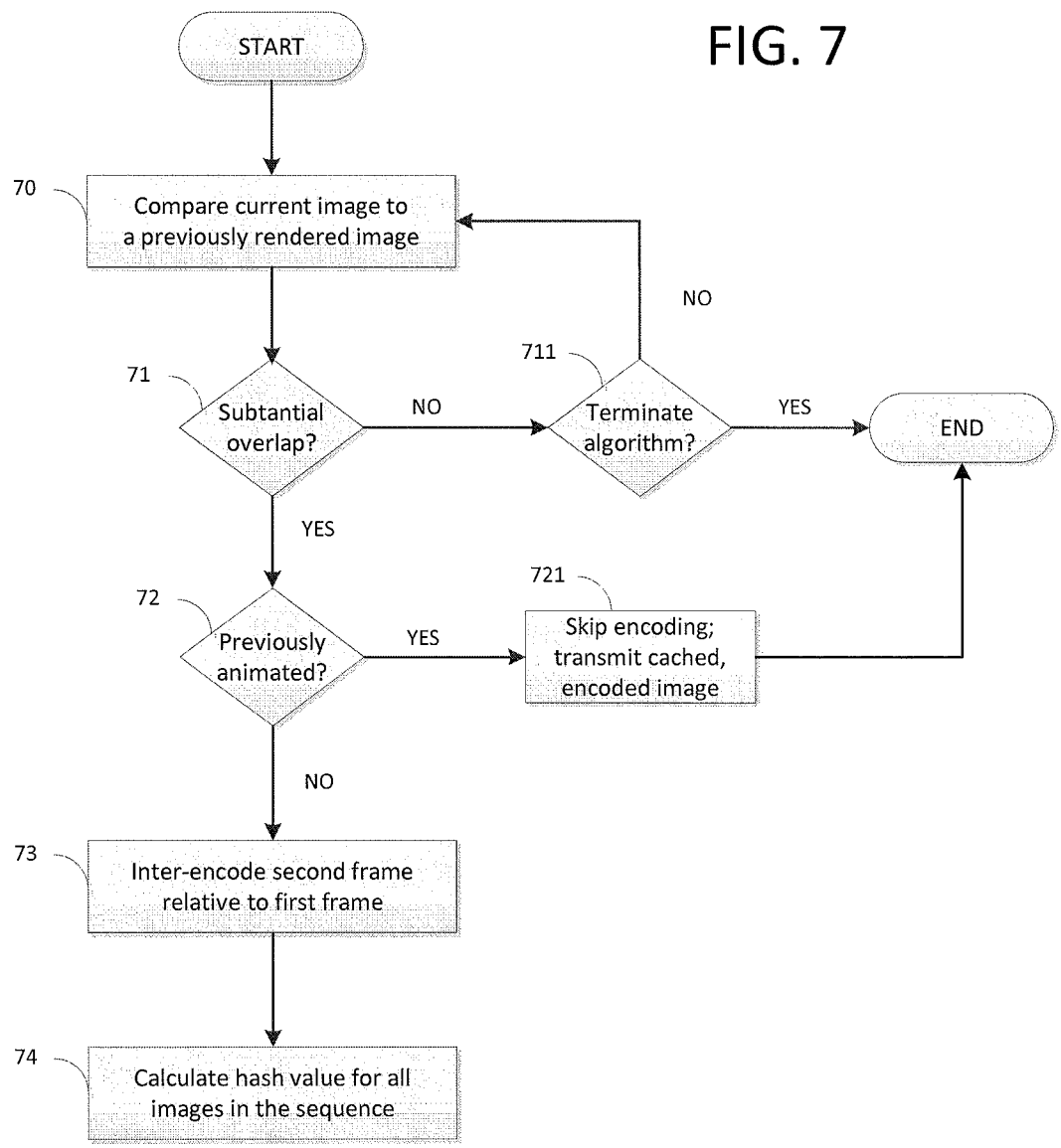
FIG. 7 is a flowchart showing a method of detecting an animation in accordance with an embodiment of the invention.

FIG. 7 is a flowchart showing a method of detecting an animation in accordance with an embodiment of the invention. The method may be applied for any given screen update during or just before process 513 (in which the encoder encodes the frame pixel data).

The method begins with process 70, in which the controller compares the current rendered image with a previously rendered image to determine screen area overlap. The locations and sizes of the two images, but not necessarily their content, are compared to determine a percentage overlap in their respective pixel "surface area". For example, a 50×100 pixel image having upper left coordinate (100,100) and a 50×100 pixel image having upper left coordinate (105,95) have an overlap of 45×95 pixels, or a percentage surface area overlap of 4275/5000=85.5%. A sequence of screen updates for a flashing button, or a graphical object that is simply changing color, will have rectangles that do not change position on the screen, and will therefore have 100% screen area overlap. The controller stores a list including coordinates of previously rendered rectangles for this purpose. Because such a list includes only coordinate data, it may include data pertaining to a large number of previously rendered frames; therefore, the two images being compared need not be in consecutively rendered frames.

In process 71, a choice is made depending on whether the percentage overlap is substantial, as defined by a given minimum percentage. For illustrative purposes, and not by way of limitation, the minimum percentage may be 50%, so that two rectangles that share at least half of their pixel coordinates in common are considered to contain images that are part of a single animation. If there is not a substantial overlap, then in process 711 the controller determines whether there are any other previously rendered images in the list against which to compare the current image. If so, the method restarts at process 70 using a different previously rendered image, but if not, then the method ends.

However, if there is substantial overlap between the two compared image coordinates, then the algorithm concludes that the images form part of a single animation. To prevent loops, in process 72 a choice is made depending on whether the currently rendered image is identical to a first image in a previously-rendered chain of overlapping images. Rather than comparing the image pixel data directly, the hash values of the two images may be compared for improved efficiency. If the hash values are equal, then the current image is the first image of the animation cycle, and it does not need to be re-encoded. Thus, in process 721 the cached, encoded image is transmitted and the method ends.

If the image was not previously animated, then in process 73 the current image is intra-encoded. Further images that are determined to belong to the same animation chain are subsequently inter-encoded with respect to the previous image in the animation. Once the controller has determined that an animation is ongoing, new images generated by an application are checked against corresponding images, in sequence, in the stored animation. In case the current image does not match the corresponding stored image, a new animation sequence is started, and the first image in the sequence is intra-coded.

In accordance with the above discussion, an animation starts with intra-coded macroblocks, and subsequent images are generated as predictive macroblocks (P or B). It is sometimes the case that an animation starts at an intermediate image that has been predictively encoded, rather than the first, intra-coded image. Such an animation has a unique encoder history, so it needs to be identified as a different object in the cache. In particular, it has a different hash value than an animation that begins with the "first" image in the chain. Therefore, each chain of images in an animation is assigned a unique hash, calculated over the pixels of all individual images that are part of the chain. The displacement on the screen between images is also included in the hash calculation.

Slice Cutting and Slice Linking

By way of background to inform another aspect of the invention, it is known in prior art MPEG systems to perform a periodic refresh of a screen by providing, to a client device, an entirely intra-coded frame (I-frame) of image data. Such refreshes eliminate screen artifacts caused by errors in the transmission of audiovisual data. However, intra-coded frames (I-frames) encode all pixel data in the image, and therefore require the use of more data than inter-coded frames (e.g. P-frames and B-frames) that merely encode the differences between successive images. I-frame transmissions therefore use more bandwidth than predictively coded frame transmissions. Moreover, they must be transmitted on a regular basis, or accumulating screen artifacts will eventually degrade the displayed image beyond usefulness.

Typically the high peak bitrate of an I-frame is handled by large buffers in the client, however this is detrimental for latency sensitive applications such as the interactive TV services that are the subject of the present invention. As a result of this problem, it is known to spread out the bitrate of a single I-frame across multiple transmitted frames by using a "rolling update". In a rolling update, sometimes also called a "curtain refresh", each consecutive frame updates a portion of the screen area using intra-encoded macroblocks. For example, each consecutive frame may update two or more rows of macroblocks, starting from the middle of the screen and progressing upwards and downwards simultaneously. The advantage to this type of refresh is that a rolling update distributes the large, intra-encoded macroblocks over multiple frames. As a result, the bitrate is slightly elevated over multiple frames, instead of spiking as it would if all intra-encoded data were transmitted in a single frame. An alternative method of handling bitrate spikes by encoding I-frames at a very low bitrate, known as "I-frame pumping", is known in the art but not discussed further herein.

Figure 8A:
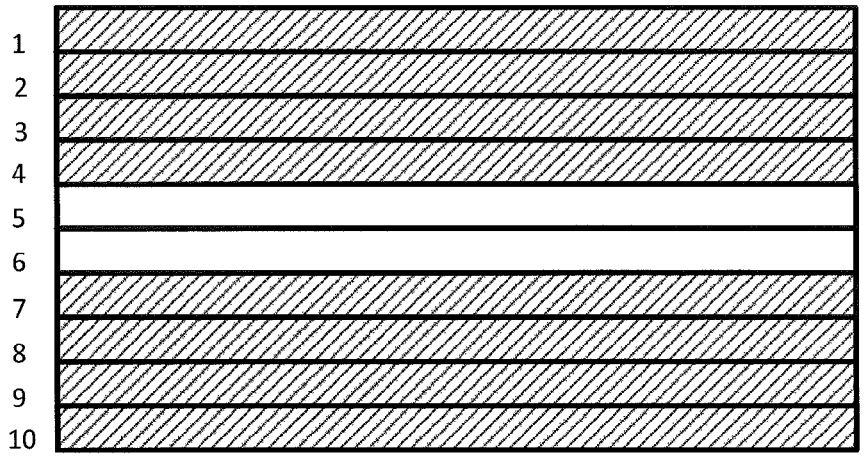
FIGS. 8A-8C show a "rolling update" of several rows of macroblocks.
Figure 8B:
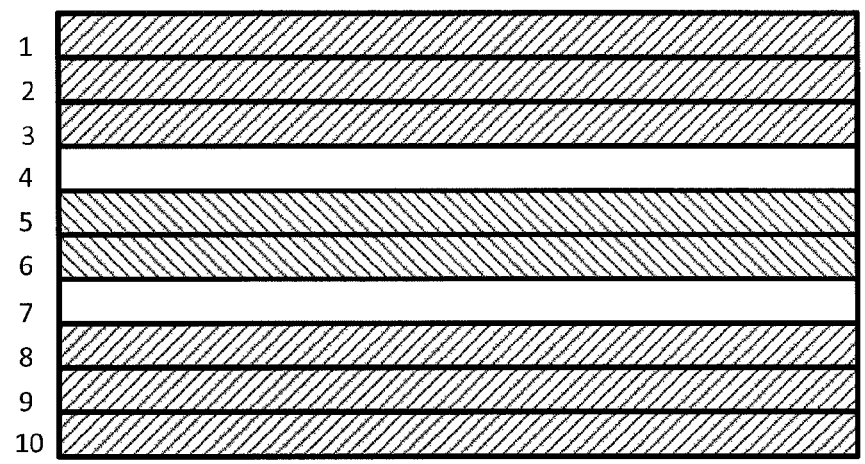
Figure 8C:
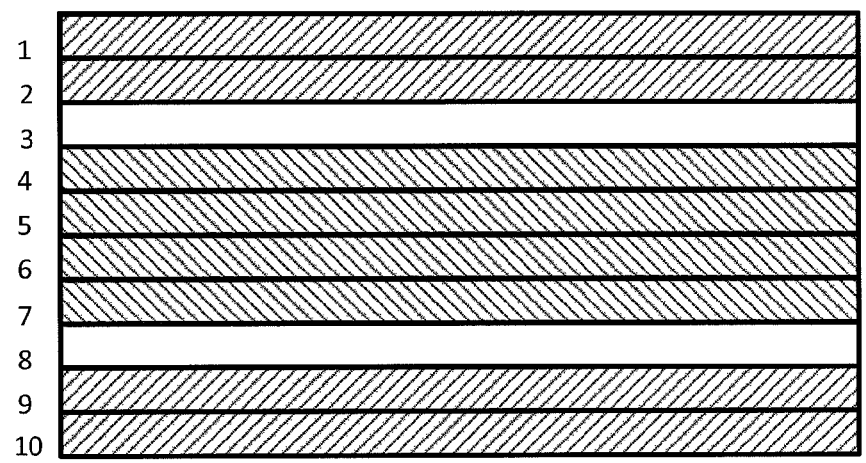

An example of a vertical rolling update is shown graphically in FIGS. 8A-8C. The example screen here consists of 10 rows of macroblocks, where each macroblock is a square of pixels. Rows having a right-slanted appearance represent predictively encoded image data from before a screen update, rows that are unshaded represent intra-encoded rows used in the rolling update, and rows having a left-slanted appearance represent predictively encoded image data having updated image data.

In FIG. 8A, central rows 5 and 6 are updated with intra-encoded macroblock data. As is known in the art, rows 5 and 6 may be represented by an intra-encoded MPEG slice (an I-slice). During this update, rows 1-4 and 7-10 may be updated with inter-encoded macroblock data pertaining to the current image (i.e., the image that is in the process of being replaced). Thus, each of these other rows may be represented by a P-slice or a B-slice. In FIG. 8B, rows 5 and 6 are updated with data (a P-slice or a B-slice) pertaining to the updated image, while rows 4 and 7 are updated with intra-encoded data (an I-slice) pertaining to the updated image, and the other rows are updated with inter-encoded data pertaining to the current image. In FIG. 8C, rows 3 and 8 are updated with intra-encoded data, while the other rows are updated with inter-encoded data. This process continues until each row has received intra-encoded macroblock data. It should be noted that newly refreshed slices can only perform motion searching and prediction within the refreshed screen area, and cannot refer to the non-refreshed areas.

One system in accordance with the invention stores screen objects as intra-encoded macroblocks, called "MPEG fragments". To generate I-frames or intra-refresh rows based upon stored MPEG fragments, slices of one or more rows have to be cut and linked. The cutting and linking methods described below may be used during active periods where there are many screen updates.

Figure 9A:
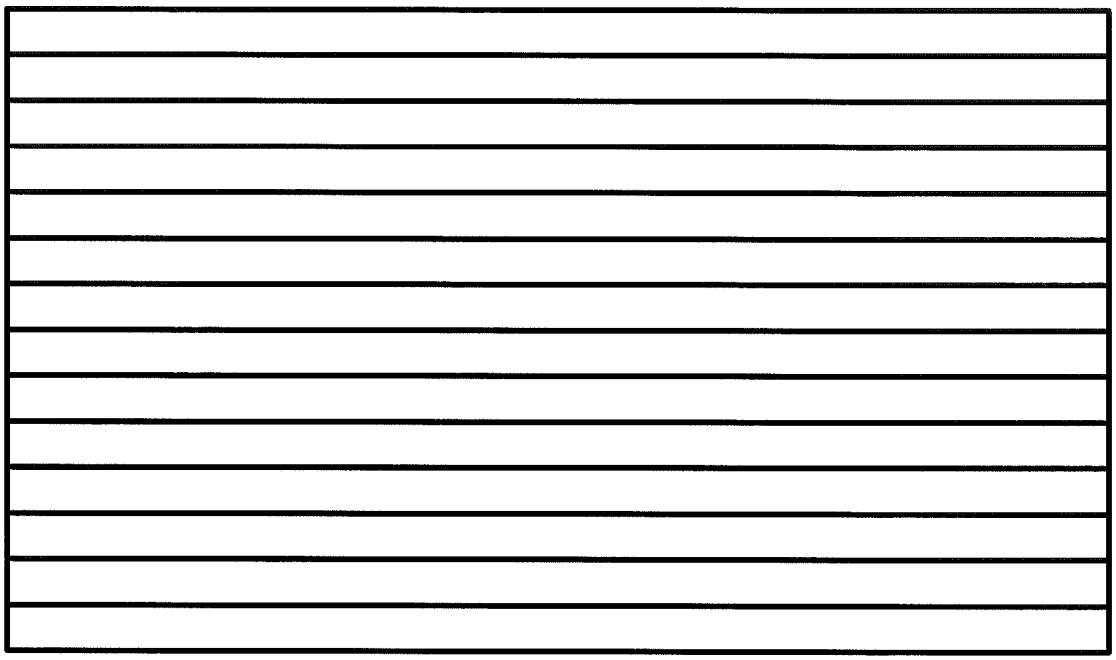
FIGS. 9A-9E illustrate the concept of slice cutting and slice linking, as used in accordance with an embodiment of the invention.
Figure 9B:
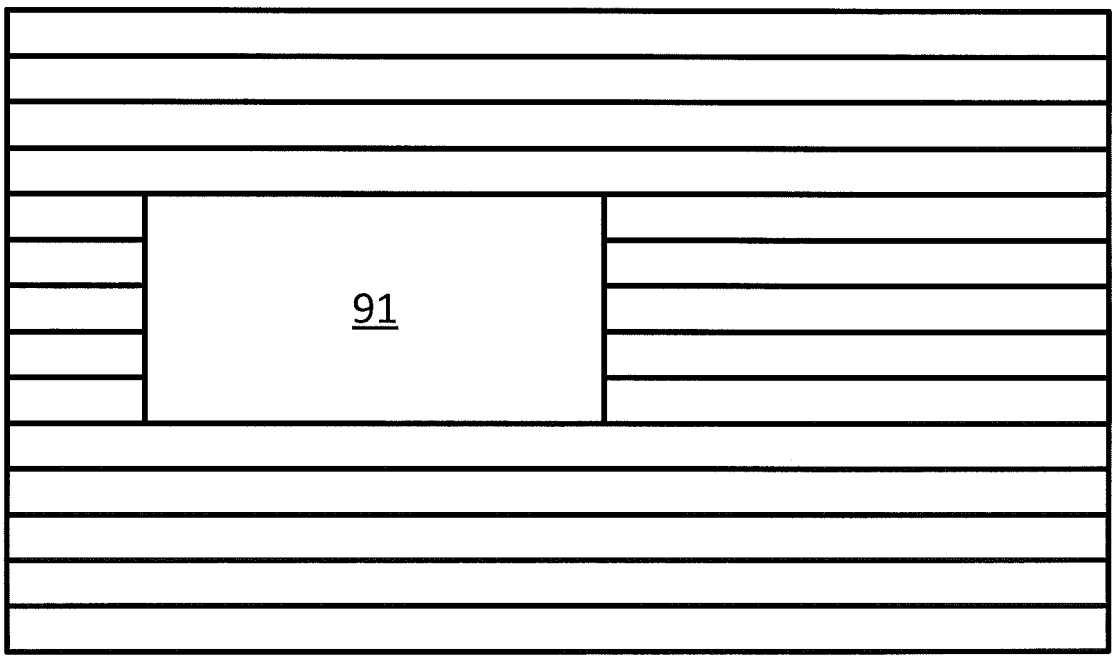

The cutting and linking principles are illustrated with reference to FIGS. 9A and 9B. FIG. 9A represents a "current image" displayed on a screen that is 14 rows of macroblocks in height and 24 columns of macroblocks (only the rows are marked). Thus, if a macroblock is a square 16 pixels on a side, this screen has a resolution of 384 by 224 pixels. FIG. 9B shows an "updated image" on the same screen, obtained by performing a screen update in accordance with an embodiment of the invention, has caused a rectangle 91 to be displayed. Rectangle 91 is five rows tall and 10 rows wide.

Figure 9C:
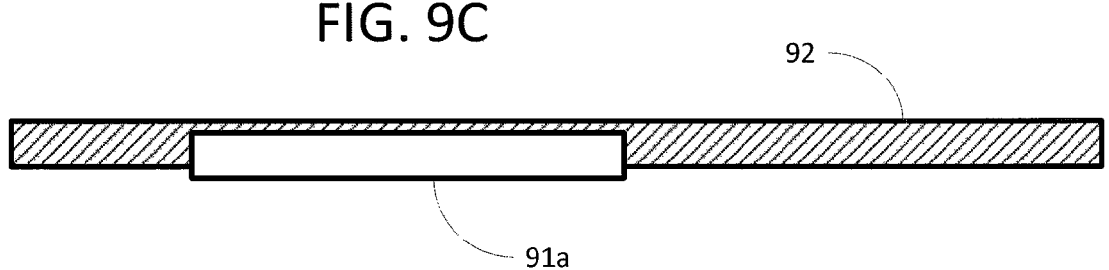
Figure 9D:
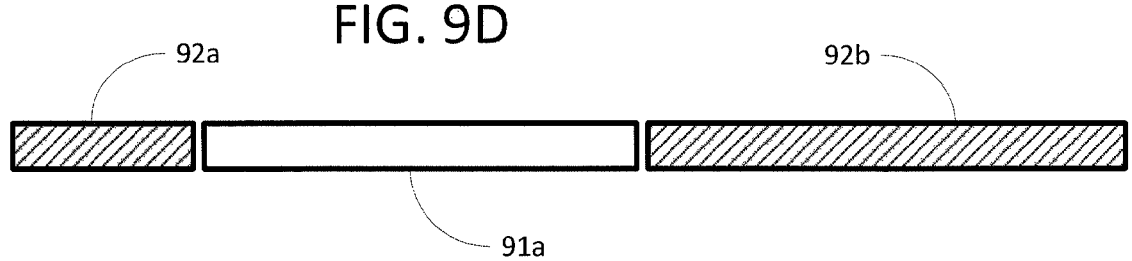
Figure 9E:
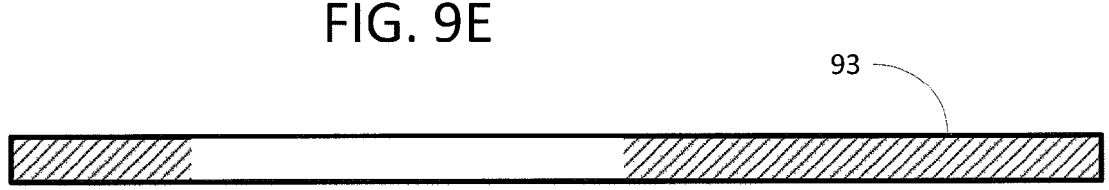

A method for integrating the image data of rectangle 91 into the rows of the screen is illustrated using FIGS. 9C-9E. While these figures show the method as applied to only one row of macroblocks, it should be understood that this method must be repeated for each row of macroblocks that is covered (or partially covered) by rectangle 91. FIG. 9C shows one full-row slice of the screen 92. Logically superimposed on this slice is a slice 91a of MPEG fragments that represents a single row of macroblocks of the rectangle 91. To insert slice 91a into the row, the slice 92 is cut using a slice cutting method to form two partial-row slices 92a, 92b as shown in FIG. 9D. The slice cutting method is described in more detail below in connection with FIGS. 10 and 11. Note that the three slices 92a, 91a, 92b together form 24 macroblocks; that is, when placed side-by-side, they have the width of a single row. However, they do not yet form a single slice. While the MPEG standard permits a row of macroblocks to be described by multiple slices, some display devices place a limit on the number of slices that may be used in a given frame (or the number of slices per second). In some extreme cases, a given frame of data may only permit as many slices as there are rows of macroblocks. Therefore, to account for such limitations, these three slices (or any two adjacent slices) may be linked to form a single slice, as shown in FIG. 9E. Slice linking is performed according to a slice linking method, described in more detail in connection with FIGS. 12 and 13.

Slice cutting is a procedure that is required to perform an intra-refresh of the entire screen, built up of several possibly overlapping MPEG fragments. To compose the intra-encoded frame, only the non-obscured macroblocks of fragments are needed. Consequently, the slices in such fragments are cut.

Figure 10:
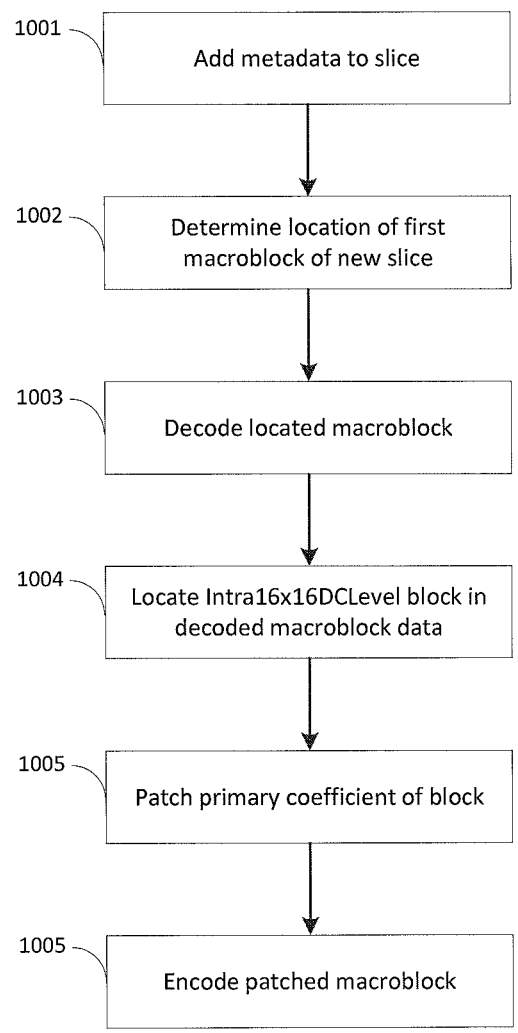
FIG. 10 is a flowchart showing a method of cutting an MPEG slice in accordance with an embodiment of the invention.

FIG. 10 is a flowchart showing a method of cutting an MPEG4 slice in accordance with an embodiment of the invention. An MPEG slice includes macroblock image data. For sake of terminology, an original slice 'S' is cut to form two slices 'S1' and 'S2', where slice 'S1' includes those macroblocks earlier in the data stream and slice 'S2' includes those macroblocks later in the data stream. It will be understood that this method may be applied to standards other than MPEG4 by appropriate modification.

Figure 11A:
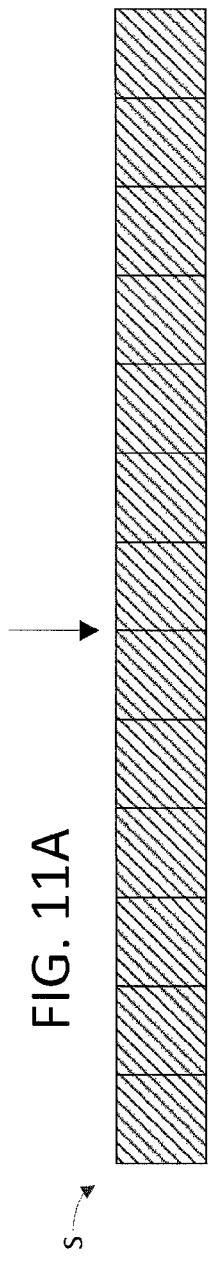
FIGS. 11A-11D show the effects of slice cutting at the level of slice data.
Figure 11B:
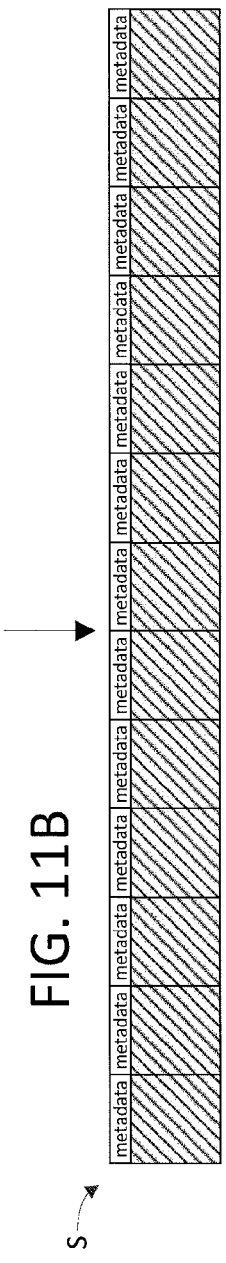
Figure 11C:
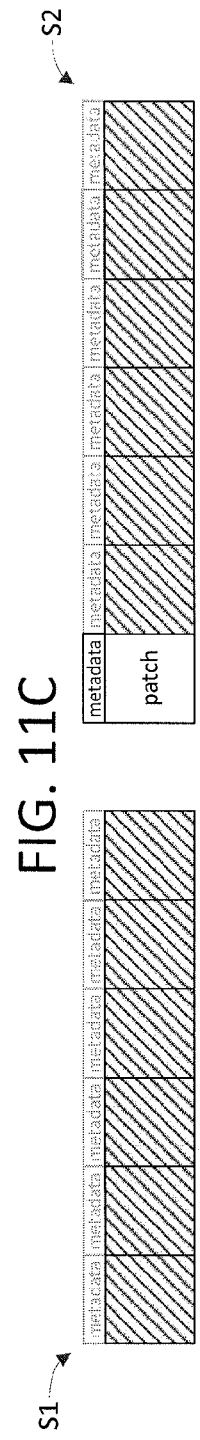
Figure 11D:
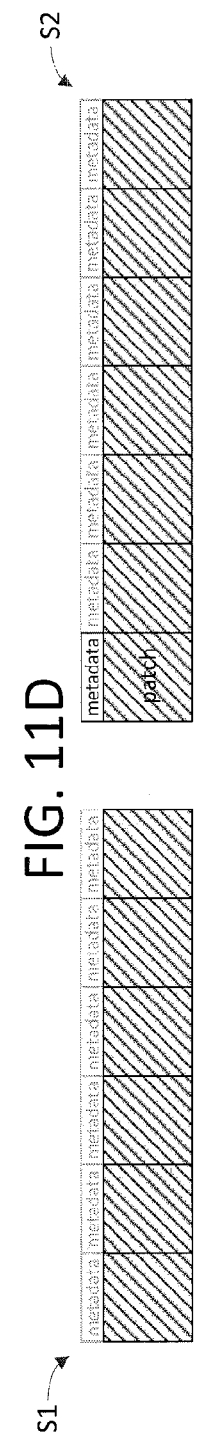

The method begins with a slice encoded (compressed) using a variable-length code (VLC) for transmission over a data network. For example, the slice shown in FIG. 11A is compressed, as indicated by the slanted lines, and contains 13 macroblocks. An arrow indicates where the slice should be cut. In process 1001, metadata are added to the slice S, for example in its elementary stream, as shown in FIG. 11B. In particular, these metadata pertain at least to the DC context of each macroblock in the slice. Next, in process 1002, the location in the compressed data stream of the start of the first macroblock of the new slice S2 is determined. This may be done by either VLC decoding the entire slice, or, if present, using macroblock pointers in the slice metadata. In process 1003, the found (compressed) macroblock is partially VLC decoded to produce uncompressed macroblock data, as shown in FIG. 11C. However, only DC luma and DC chroma information needs to be decoded; the full image data of the macroblock should not be decoded in the interest of efficiency. In process 1004, the DC luma and DC chroma information is located in the uncompressed data. Locating these data values may be done using methods known in the art. For example, in the H.264 standard, this information is stored in the Intra16x16DCLevel data block. The method only requires decoding of this information; other image data may remain compressed. In process 1005, the primary coefficient of the DC luma or DC chroma level is patched to match the DC context of the default slice start context, as shown in FIG. 11C. In this way, the macroblock may act as the first macroblock of an entire slice, namely the new slice S2. Patching may be accomplished using a bit-shifting operation; that is, the bits of the DC luma value or the DC chroma value may be shifted according to low-level, efficient bit-shifting instructions. In process 1006, the decoded portions of the patched macroblock are VLC re-encoded, as shown in FIG. 11D. Note that, in embodiments in which the slice metadata includes pointers to macroblocks in the compressed data stream, only the data of the patched macroblock must be VLC decoded and re-encoded; data of the other macroblocks in original slice S (including all data of slice S1 and the other macroblocks of slice S2) remain undisturbed by the method.

Figure 12:
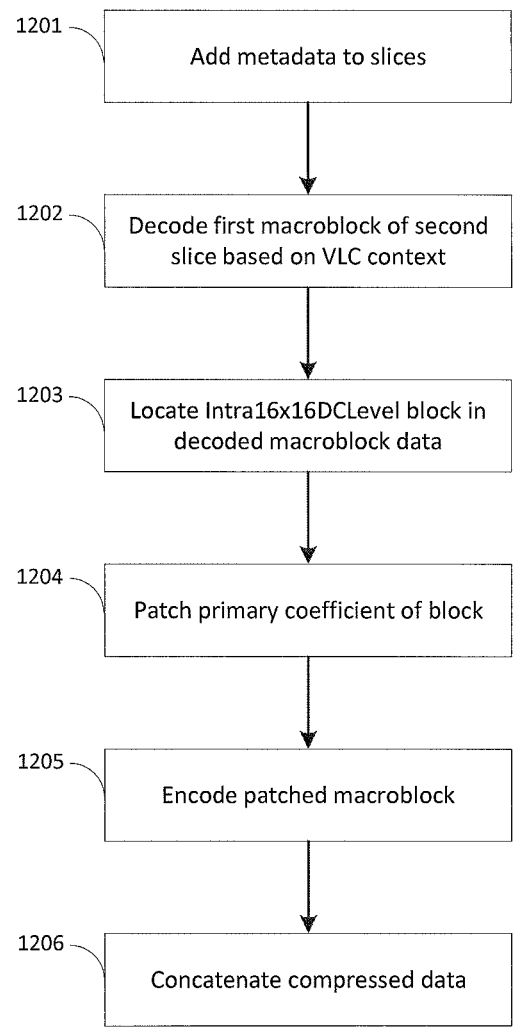
FIG. 12 is a flowchart showing a method of linking MPEG slices in accordance with an embodiment of the invention.

FIG. 12 is a flowchart showing a method of linking MPEG slices in accordance with an embodiment of the invention. Screen updates that consist of multiple fragments may result in more slices per line than can be permitted for certain end devices, especially for H.264 encodings. The purpose of slice linking is to reduce the number of slices by linking two or more slices together. For the sake of simplicity, the process is described with respect to only two slices; those having ordinary skill in the art should understand that the process may be repeated to operate on more than two slices.

Figure 13A:
FIGS. 13A-13D show the effects of slice linking at the level of slice data.
Figure 13B:
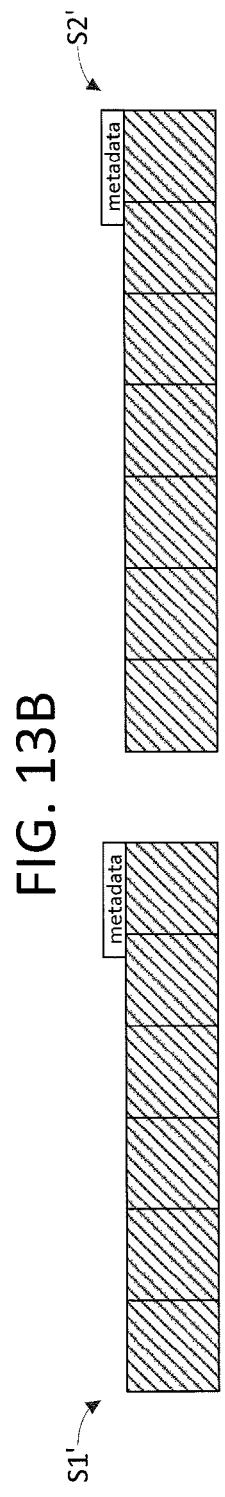
Figure 13C:
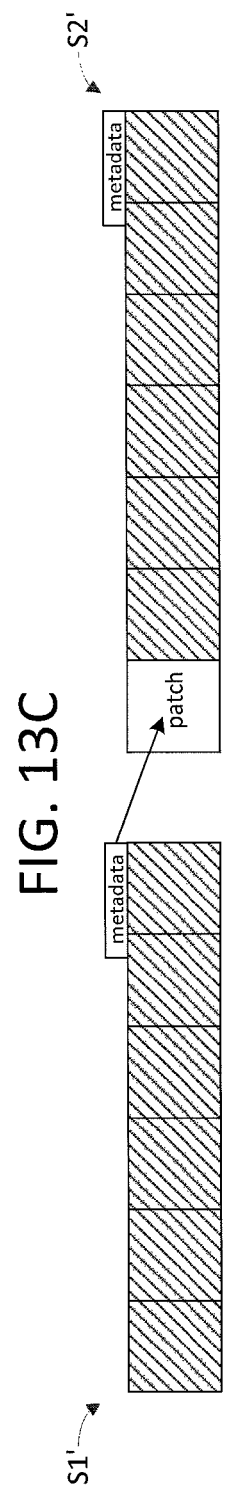
Figure 13D:
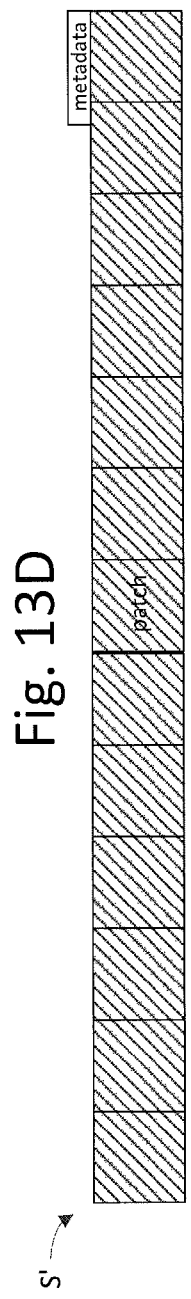

This method begins with two VLC-encoded slices S1' and S2' that must be linked, as shown in FIG. 13A. In process 1201, metadata are added to the slices, as shown in FIG. 13B. These metadata comprise at least the DC context of the last macroblock (right-most) of slice S1', the VLC state of this macroblock, and the DC context of the first macroblock (left-most) of the slice S2'. In process 1202, the first macroblock of slice S2' is partially VLC decoded using the VLC state of the last macroblock of slice S1'. As with the method of FIG. 10, only the Intra16×16DCLevel data block needs to be decoded. In process 1203, the Intra16×16DCLevel block is obtained for the first macroblock of slice S2'. In process 1204, the primary coefficient of this block is patched, using the metadata, to match the DC context of the last macroblock of the slice S1', as shown in FIG. 13C. The VLC tables for the left row of AC blocks are modified correspondingly. After patching, in process 1205 the decoded portions of the macroblock are VLC re-encoded. In process 1206, the compressed data are concatenated to form a new compressed slice S', as shown in FIG. 13D. As before, only the data of the patched macroblock must be VLC decoded and re-encoded; all data of slice S1' and data of the other macroblocks of slice S2' appear unchanged (and compressed) in the new slice S'.

The embodiments of the invention described above are intended to be merely exemplary; numerous variations and modifications will be apparent to those skilled in the art. All such variations and modifications are intended to be within the scope of the present invention as defined in any appended claims. For example, while H.264 stores DC luma and DC chroma information in a Intra16×16DCLevel data block, other standards such as MPEG2 and VC-1 store this data elsewhere; the methods and systems described above may be modified accordingly.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A method of providing an image to a client device from an application execution environment having a layout engine that assembles graphical components into a graphical user interface screen for a graphical application, and a rendering library that renders graphical components into pixels, the method comprising:

receiving, from the layout engine, one or more paint instructions having parameters that pertain to a given graphical object;

computing a hash value based on the received one or more paint instructions;

when the hash value is contained within a cache memory, retrieving, from the cache memory, encoded audiovisual data that are uniquely associated with the hash value, and transmitting the retrieved audiovisual data to the client device; and when the hash value is not contained within the cache memory,
- forwarding the received one or more paint instructions to the rendering library for rendering the graphical object into pixels according to the one or more paint instructions,
- encoding the rendered pixels into encoded audiovisual data,
- storing the hash value and the encoded audiovisual data in the cache memory, wherein the hash value and the encoded audiovisual data are uniquely associated, and
- transmitting the encoded audiovisual data to the client device.

2. The method of claim 1, wherein the client device is one of the group consisting of: a television, a television set-top box, a tablet computer, a laptop computer, a desktop computer, and a smartphone.

3. The method according to claim 1, wherein the graphical application is one of the group consisting of: a web browser and a menu interface.

4. The method according to claim 1, wherein the encoding comprises dividing the screen into blocks of pixels, the method further comprising:
- after receiving the one or more paint instructions and before computing the hash value, determining the smallest rectangle consisting of whole blocks of pixels that surrounds the graphical object;
- requesting that the layout engine repaint the smallest surrounding rectangle; and
- receiving, from the layout engine, painting data that include at least one paint instruction having parameters that reflect the smallest surrounding rectangle, wherein computing the hash value is based on the painting data.

5. The method according to claim 1, further comprising:
determining that the hash value is contained within the cache memory by comparing the hash value to a stored hash value of a cached image that forms part of an animation.

6. A tangible device on which is stored non-transitory computer program code for providing an image to a client device from an application execution environment having a layout engine that assembles graphical components into a graphical user interface screen for a graphical application, and a rendering library that renders graphical components into pixels, the computer program code comprising:
- program code for receiving, from the layout engine, one or more paint instructions having parameters that pertain to a given graphical object;
- program code for computing a hash value based on the received one or more paint instructions;
- program code for retrieving, from a cache memory, encoded audiovisual data that are uniquely associated with the hash value, and transmitting the retrieved audiovisual data to the client device when the hash value is contained within the cache memory; and
- program code for:
  - forwarding the received one or more paint instructions to the rendering library for rendering the graphical object into pixels according to the one or more paint instructions,
  - encoding the rendered pixels into encoded audiovisual data,
  - storing the hash value and the encoded audiovisual data in the cache memory, wherein the hash value and the encoded audiovisual data are uniquely associated, and
  - transmitting the encoded audiovisual data to the client device, when the hash value is not contained within the cache memory.

7. The device according to claim 6, wherein the client device is one of the group consisting of: a television, a television set-top box, a tablet computer, a laptop computer, a desktop computer, and a smartphone.

8. The device according to claim 6, wherein the graphical application is one of the group consisting of: a web browser and a menu interface.

9. The device according to claim 6, wherein the program code for encoding comprises program code for dividing the screen into blocks of pixels, the computer program code further comprising:
- program code for determining the smallest rectangle consisting of whole blocks of pixels that surrounds the graphical object after receiving the painting data and before computing the hash value;
- program code for requesting that the layout engine repaint the smallest surrounding rectangle; and
- program code for receiving, from the layout engine, painting data that include at least one paint instruction having parameters that reflect the smallest surrounding rectangle, wherein computing the hash value is based on the painting data.

10. The device according to claim 6, further comprising:
program code for determining that the hash value is contained within the cache memory by comparing the hash value to a stored hash value of a cached image that forms part of an animation.

11. The device according to claim 6, further comprising:
- program code for receiving a current image into a computing processor;
- program code for receiving a previously rendered image into the computer processor, the previously rendered image being uniquely associated with an encoded image in the cache memory;
- program code for transmitting to the client device the cached, encoded image without encoding the current image when the current image and the previously rendered image are identical; and
- program code for:
  - encoding the current image according to a predictive encoding scheme,
  - storing the encoded current image in the cache memory, and
  - transmitting to the client device the encoded current image when the current image and the previously rendered image are not identical but share at least a given minimum percentage of their pixels.

12. The device according to claim 11, wherein the predictive encoding scheme is an MPEG encoding scheme.

13. The device according to claim 11, wherein the previously rendered image was not rendered immediately previously to the current image.

14. The device according to claim 11, wherein the previously rendered image is uniquely associated with a predictively encoded image in the cache memory.

15. The device according to claim 11, further comprising program code for computing a hash value for each unique chain of images that forms an animation, the hash value being a function of all images in the chain of images and a screen displacement.

16. The device according to claim 6, further comprising program code for forming two encoded MPEG slices from data comprising a given encoded MPEG slice, each encoded MPEG slice comprising a sequence of encoded macro blocks, the program code comprising:
program code for locating, in the given MPEG slice, a location of a macro block that is encoded according to a variable length code;
program code for decoding the encoded macroblock according to the variable length code;
program code for altering a DC luma value in the decoded macroblock; and
program code for encoding the altered macroblock according to the variable length code,
wherein the first formed MPEG slice consists of the data of the given MPEG slice up to but not including the encoded macro block, and the second formed MPEG slice consists of the encoded macroblock and any subsequent encoded macroblocks in the given MPEG slice.

17. The device according to claim 6, further comprising program code for combining a first encoded MPEG slice and a second encoded MPEG slice to form a third encoded MPEG slice, each encoded MPEG slice comprising a sequence of encoded macro blocks, the program code comprising:
program code for decoding the first macro block of the second slice according to a variable length code;
program code for altering a DC luma value in the decoded macroblock;
program code for encoding the altered macroblock according to the variable length code; and
program code for concatenating the data of the first slice with the encoded macro block and the undecoded data of the second slice to form the third slice.

18. A system for providing an image to a client device from an application execution environment having a layout engine that assembles graphical components into a graphical user interface screen for a graphical application, and a rendering library that renders graphical components into pixels, the system comprising:
a memory;
a shim comprising hardware or a combination of hardware and software that is configured to:
receive, from the layout engine, one or more paint instructions having parameters that pertain to a given graphical object,
compute a hash value based on the received one or more paint instructions, and
when the hash value is not contained within the memory, forward the received one or more paint instructions to the rendering library for rendering the graphical object into pixels according to the one or more paint instructions; and
a controller comprising hardware or a combination of hardware and software that is configured to:
retrieve, from the memory, encoded audiovisual data that are uniquely associated with the hash value, and
transmit the retrieved audiovisual data to the client device when the hash value is contained within the memory; and
transmit, to the client device, encoded audiovisual data comprising a rendering of the graphical object into pixels according to the received one or more paint instructions when the hash value is not contained within the memory.

19. The system according to claim 18, wherein the client device is one of the group consisting of: a television, a television set-top box, a tablet computer, a laptop computer, a desktop computer, and a smartphone.

20. The system according to claim 18, wherein the graphical application is one of the group consisting of: a web browser and a menu interface.

21. The system according to claim 18, wherein the memory stores a sequence of images that collectively form an animation, and wherein the controller is further configured to determine that the hash value is contained within the memory by comparing the hash value to a stored hash value of a cached image that forms part of the animation.

22. The system according to claim 18, wherein the audiovisual data are encoded according to an MPEG encoding scheme.

23. The system according to claim 18, further comprising a block-based encoder that is configured to form two encoded MPEG slices from data comprising a given encoded MPEG slice, each encoded MPEG slice comprising a sequence of encoded macro blocks, by:
locating, in the given MPEG slice, a location of a macro block that is encoded according to a variable length code; decoding the encoded macroblock according to the variable length code;
altering a DC luma value in the decoded macroblock; and
encoding the altered macroblock according to the variable length code,
wherein the first formed MPEG slice consists of the data of the given MPEG slice up to but not including the encoded macro block, and the second formed MPEG slice consists of the encoded macroblock and any subsequent encoded macroblocks in the given MPEG slice.

24. The system according to claim 18, further comprising a block-based encoder that is configured to combine a first encoded MPEG slice and a second encoded MPEG slice to form a third encoded MPEG slice, each encoded MPEG slice comprising a sequence of encoded macroblocks, by:
decoding the first macro block of the second slice according to a variable length code;
altering a DC luma value in the decoded macroblock; P
encoding the altered macroblock according to the variable length code; and
concatenating the data of the first slice with the encoded macro block and the undecoded data of the second slice to form the third slice.

* * * * *

UNITED STATES PATENT AND TRADEMARK OFFICE
CERTIFICATE OF CORRECTION

| | |
|---|---|
| PATENT NO. | : 9,123,084 B2 |
| APPLICATION NO. | : 13/445104 |
| DATED | : September 1, 2015 |
| INVENTOR(S) | : Brockmann et al. |

It is certified that error appears in the above-identified patent and that said Letters Patent is hereby corrected as shown below:

In the claims, claim 24, col. 22, line 51, please delete "macroblock; P" and insert --macroblock;--.

Signed and Sealed this
Twenty-sixth Day of January, 2016

Michelle K. Lee
*Director of the United States Patent and Trademark Office*